United States Patent [19]
Dierkes et al.

[11] Patent Number: 5,576,909
[45] Date of Patent: Nov. 19, 1996

[54] METHOD FOR POSITIONING A DATA TRANSDUCER HEAD IN A ROTATING DISK DRIVE DATA STORAGE DEVICE

[75] Inventors: Franz J. Dierkes, Los Gatos; Fidencio Mederos; Ich V. Pham, both of San Jose, all of Calif.

[73] Assignee: Ministor Peripherals International Limited, San Jose, Calif.

[21] Appl. No.: 394,534

[22] Filed: Feb. 16, 1995

[51] Int. Cl.$^6$ .................................................. G11B 5/596
[52] U.S. Cl. ................................ 360/78.09; 360/78.07; 360/78.06; 360/77.04
[58] Field of Search .............................. 360/78.09, 78.07, 360/78.06, 78.04, 77.08, 77.07, 77.05, 77.04, 78.14

[56] References Cited

U.S. PATENT DOCUMENTS

| | | | |
|---|---|---|---|
| 4,488,189 | 12/1984 | Axmear | 360/78.04 |
| 4,679,103 | 7/1987 | Workman | 360/78.14 |
| 4,914,644 | 4/1990 | Chen et al. | 360/78.09 X |
| 5,119,250 | 6/1992 | Green | 360/78.09 |
| 5,170,299 | 12/1992 | Moon | 360/78.14 |
| 5,404,253 | 4/1995 | Painter | 360/78.09 |

OTHER PUBLICATIONS

Seagate 2.5" Family of Disk Drives advertisement, © 1994 (No Month).
Western Digital Caviar Lite AL 2120/ AL 2170 Technical Reference Manual © 1993 (No Month).
Digital Control of Dynamic Systems by Gene Franklin et al, 2nd. Ed., © 1990, pp. 13–100, 516–750. (No Month).

*Primary Examiner*—Aristotelis Psitos
*Assistant Examiner*—Alan Faber
*Attorney, Agent, or Firm*—D'Alessandro & Ritchie

[57] ABSTRACT

A method of controlling track seeking and track following of a head in a disk file having servo information recorded thereon to provide a track number and a position error signal (PES). The physical parameters of the disk file are modeled by at least three sets of constants associated with selected numbers of tracks. An actuator is connected to the head by a support arm assembly and is responsive to a control signal for positioning the head. The method comprises, for each servo information sample, the steps of predicting a relative position, velocity, and bias of a data head. It is determined whether the predicted relative data head position corresponds to the selected number of tracks, if not, at least the predicted relative data head position is rescaled to form the predicted relative data head position to correspond to the selected number of tracks of the predicted data head position prior to rescaling. The set of the one of at least three sets of constants is changed to correspond to the selected number of tracks of the predicted data head position prior to rescaling. A measured relative data head position is formed from the track number, the PES and the target track. An error in a relative data head position is estimated. A control signal as a function of the relative position error, the predicted relative position, the predicted velocity, the predicted bias, and the adjusted velocity, of the data head, is generated.

44 Claims, 5 Drawing Sheets

Microfiche Appendix Included
(1 Microfiche, 32 Pages)

5,576,909

METHOD FOR POSITIONING A DATA TRANSDUCER HEAD IN A ROTATING DISK DRIVE DATA STORAGE DEVICE

MICROFICHE APPENDIX

One (1) microfiche is incorporated herein. Thirty-two (32) frames of computer program listings appear in the microfiche appendix.

BACKGROUND OF THE INVENTION

1. Field of the Invention

The present invention relates to methods used for positioning a data head over a data track in a rotating disk drive data storage device. More particularly, the present invention relates to methods for positioning a data head over a radially located data track in a disk file which employs a multimodal servo control system wherein the operating mode of the servo control system is determined by a predicted relative data head position.

2. The Prior Art

Disk files are information storage devices which utilize one or more rotatable disks with concentric data tracks formed thereon for magnetically recording data, one or more data heads for reading or writing data onto the various tracks, and an actuator (usually a voice coil motor (VCM)) connected by a support arm assembly to the data head(s) for moving the data head(s) to a desired track and maintaining the data head(s) over the track centerline during read or write operations. Each disk has two data surfaces, and the disks are disposed on a spindle driven by a spindle motor. The read/write (RNV) information is electrically coupled to and from the data head by way of a R/W channel. The RAN channel may include amplifiers, filters and detectors, as required.

The radial movement of the data head to a desired data track is referred to as track accessing, or "seeking", while the maintaining of the data head over the centerline of the desired data track during a read or write operation is referred to as "track following". The VCM typically comprises a coil movable through the magnetic field of a permanent magnetic stator as is well known in the art. The application of current to the VCM causes the coil, and thus the attached data head, to move radially over the surface of the disk. The acceleration of the coil is proportional to the applied current, so that ideally the head is perfectly stationary over a desired track if there is no current applied to the coil.

In disk files which have a relatively high density of data tracks on the disk, for example, more than about 2000 tracks per inch (TPI), it is necessary to employ a servo control system to efficiently move the data head between the data tracks and to maintain the data head within a given tolerance of distance over the centerline of the desired data track during read or write operations. Such a servo system requires that servo information be prerecorded on the disk file. Servo information can be prerecorded on either a dedicated servo surface or on servo sectors located on each disk surface or on a combination of both. In a disk file which has less than four disks, it is generally more efficient to prerecord the servo sector information on each track of every disk surface. In a disk file which has more than four disks, a dedicated servo surface either alone or in combination with servo sector information is generally employed. All of these mechanisms for servo control information are well known to those of ordinary skill in the art.

Servo sectors are angularly spaced pie-piece-shaped sectors which are interspersed among the data sectors on the data disks. The prerecorded servo information is normally written to the disks by a servo writer at the factory. The prerecorded servo information, including servo bursts, is read off the disks, demodulated, and processed by the servo control system. The results are then applied to the input of the servo electronics which control the current to the VCM and thus the radial position of the head(s) over the disk surface.

Servo bursts are fixed amplitude analog signals written to the disk surface at precise locations which are used to define the exact radial position of the data tracks on the disk surface. Prior art servo bursts come in groups of 2, 3, 4 or more. As the head passes over each servo burst, the amplitude of the analog signal read from the servo burst is a function of the radial position of the head and is a maximum as the head passes over the center of the burst. Referring to FIG. 1, a prior art servo sector is diagrammed. In operation, the data head will pass over the AGC portion of the servo sector 12, the servo sync 14 and the index 16 before reaching the servo information. The servo bursts are diagrammed by boxes labelled A, B, C, and D. The data head will read the A burst, the B burst, the C burst and then the D burst, all of which are constant amplitude signals. The centers of data tracks are, by definition, located at the edges of the A/B bursts as shown and labelled in FIG. 1 as T1, T2, T3, etc. In this servo pattern, the servo bursts are recorded in spatial quadrature with one another. The servo bursts A through D are used to generate a position error signal (PES). The PES represents the radial off track distance of the data head from the track centerline within a ½ track width distance. The PES provides a position signal which is linear with respect to the actual position of the data head within the data track.

The servo bursts are generally independently magnitude detected in a read channel. Detecting each servo burst independently generates some DC offsets among the bursts which must be calibrated during the drive power up. If the DC offsets are not calibrated the position of the data head determined by the spatial quadrature of the servo bursts will not be correct. A better technique, as is presently employed by the assignee of the inventors herein in the Ministor 1.8" disk drive product line, is to use a single detector for all servo bursts so that there is no offset associated with any channel. Another advantage of using a single detector is that hardware complexity and size is significantly reduced. According to this approach, only one output from the read channel and one sample and hold capacitor for detecting the servo bursts is required instead of the standard four employed for a servo sector having four servo bursts.

In the prior art, servo control systems describe the position of the data head on the disk surface either in relative or absolute terms. These will be referred to as a relative data head position description and an absolute data head position description. In a servo control system using a relative data head position description, the relative data head position is defined as the difference between the current position of the data head and the target position of the data head. In a servo control system using an absolute description, the absolute data head position is defined simply as the current position of the data head.

With the high track densities of modern disk drives, an issue arises as to whether a relative or absolute data head position description should be used. For currently commercially available disk drives, the number of data tracks can be expected to be about 3500 TPI. In a 1.8" form factor drive this results in approximately 1500 tracks across the disk surface. The number of bits required to address 1500 tracks is eleven ($2^{11}=2048$). Additional bits are used to describe the data head position. Of the additional bits, one is usually allocated to sign (this is used in relative position description only and indicates whether movement of the data head to the target requires an increase or a decrease in radial distance to the disk spindle or center) and a selected number of bits are used to describe the PES.

The number of bits used to describe the PES is a critical determination in control systems. If enough bits are not allocated to the PES, then control of the data head cannot be maintained during track following. For the example just cited, if an absolute description is used, then for 16 bit processing, eleven bits will be allocated to the track number at all times, and five bits will be available to describe the PES. It is well accepted by those of ordinary skill in the disk drive art that five bits, which provides a resolution of 1 in 32, is not adequate for the track following function. Further, in all instances known to the inventors, a minimum of 8 bits (resolution of 1 in 256) are used for the PES in track following in prior art disk drives.

The resolution requirements of the PES are due to the dynamics of the disk drive system itself and the fact that the data head must usually be within approximately 10% of the data track width away from the track centerline for write operations. These dynamics with which the servo control system must operate include at least the following: position reference noise, uncertain high-frequency actuator dynamics, sensor noise, sensor nonlinearities, variable actuator parameters which may vary from motor to motor, vary for the length of the stroke, vary for the operating temperature of the drive, and vary for the age of the drive. All prior art disk drive servo control systems account for the dynamics of the disk drive either by mathematical modeling of the disk drive or by some method of lumped parameter control.

If the PES does not have enough resolution, the disk drive dynamics will cause the servo control system to lose control of the positioning of the data head. As such, where an absolute data head position description is used, the current requirements in the art of at least 8 bits for the PES in track following and 11 bits for the track number for current commercial track densities of approximately 2000 TPI or greater, lead to the conclusion that at least 19 bit processing must be employed. Since 19 bit processors are not reasonably commercially available, 32 bit processing is therefore employed.

Where a relative data head position description is used as an alternative to the absolute position description, 16 bit processing is possible, even with current commercial track densities. An example of 16 bit processing using relative addressing can be seen in the Ministor 1.8" disk drive, MP340P, manufactured by the assignee of the present invention. In the Ministor MP340P disk drive, the servo control system is implemented using a proportional integral derivative control method, known in the art as PID control. With PID control, the servo control system determines the control signal for supplying current to the VCM based upon the summation of signals derived from the position of the data head, the derivative of the position of the data head, and the integral of the position of the data head. Proportional control is generated by multiplying the relative data head position by a fixed gain. (It should be noted that the fixed gain by which the position difference is multiplied changes as the difference in position between the current position of the data head and the target position of the data head changes from greater than ½ track to less than ½ track). The derivative of the position of the data head is used to represent the velocity of the data head. The derivative control is generated by multiplying the data head velocity by a fixed gain, and is used to provide damping for the data head. The integral control is generated by multiplying the integrated relative data head position by a fixed gain, and the integral control is used to increase a low frequency gain which corrects for the error of the position of the data head when it is track following. The summation of the proportional, derivative and integral control is used to determine the current supplied to the VCM. Another example of a servo control system using PID control can be found in the servo control system in the program listing attached to U.S. Pat. No. 5,170,299 granted to Ronald R. Moon and entitled "Edge Servo for Disk Drive Head Positioner." U.S. Pat. No. 5,170,299 and which is hereby incorporated herein by reference.

In the Ministor MP340P drive both a relative data head position description and PID control are used as follows. For a current data head position which is more than 16 tracks away from the target track, the description of the data head position used by the servo control system is given by 8 bits of track information, 7 bits of PES and 1 bit for sign. As the data head moves to within 16 tracks, but is still more than ½ track from the target track, the data head position description has 4 bits for the track number, 9 bits for the PES and 1 bit for the sign. For less than ½ track, 1 bit is allocated to the track number, 9 bits are allocated to the PES and 1 bit to sign. Accordingly, the requirement of providing a minimum of 8 bits for the PES in track following, as explained above, is satisfied.

It is well known in the art that PID control provides less than optimal control for several reasons. One is that the dynamics of the disk drive system, as explained above, are all treated in a lumped fashion. In other words, none of the different disk drive dynamics is accounted for separately, rather, they are all lumped together. Another weakness in PID control is that the signal representing the integral of the position cannot realistically be included by the servo control system in the control signal until the data head is within 16 tracks of the target position, because it may introduce too much error. Accordingly, in the Ministor MP340P, the servo control system in effect uses PD control until the data head is within 16 tracks of the target position and uses PID control thereafter. Finally, a major weakness of PID control can be seen in comparing PID control to a servo control system which implements control by a method known as the state estimator method.

An example of the state estimator method is given in U.S. Pat. No. 4,679,103 granted to Michael I. Workman and entitled "Digital Servo Control System for a Data Recording Disk File" and which is incorporated herein by reference. In the state estimator method, the dynamics of the disk drive system are more specifically accounted for by constants having values which are derived from parameters which describe a working model of the VCM and support arm assembly for the data head. A detailed description of the design and implementation of the dynamics of such systems is given in Chapter 12 of the book titled "Digital Control of Dynamic Systems" 2nd edition by Franklin, Powell, and Workman. Using these state variables the position, velocity and bias of the data head are predicted. From the predicted position, velocity and bias of the data head and the measured position of the data head and the measured VCM current (those of ordinary skill in the art will recognize that in small disk drives utilizing transconductance amplifiers to supply the current to VCM, that the VCM current need not be measured), estimates of the position, velocity and bias of the data head are made.

These estimates provide for much better servo system control than the measured position, the derivative of the measured position and the integral of the measured position provided by PID control. The absence of using an estimate of the position, velocity and bias of the data head in PID control is a substantial shortcoming. The use of the state estimator method to predict the data head position functions as a filter to minimize the effect of the noise in the measured data head position. It is well known in the art, that in PID control, that differentiating a noisy measured head position to obtain the data head velocity introduces error into the data head velocity and, accordingly, is not an ideal technique. Without the predicted data head position, predicted data head velocity and the predicted data head bias the servo control will respond to these irregularities. In track seeking, this means that the radial velocity of the data head is not optimized to avoid overshoot, resulting in a seeking performance which is poor by the current standards in the art. During track seeking, excessive disturbance occurs when the servo control system responds to error in the measured head position. This disturbance can excite the mechanical resonance of the data head support arm assembly which results in oscillation of the data head while arriving at the desired data track. In servo control systems using an estimated position, much of the error in position imposed by the disk drive dynamics will be filtered out so that the performance of the disk drive may be more readily optimized.

One advantage that PID control has held over the state estimator method is that it may be implemented using a relative data head position description and hence, 16 bit processing as described above. It has generally been accepted in the art that the resolution of the state variables must be such so that during track following the dynamics of the disk drive are correctly modeled. In view of this, the number of bits allocated to the PES in the position descriptions has been a minimum of 8 bits, regardless of the number of tracks between the current position of the data head and the target position of the data head. Accordingly, it has been accepted in the art that 32 bits of processing are required to implement the state estimator method, since at least 11 bits will be allocated to the track number for current disk drives and at least 8 bits will be allocated to the PES.

More generally, it can be stated that in the present approach in the art, that if M bits are required to represent the track numbers on the disk surface, and N bits are required to represent the PES in track following, then at least M+N bits of processing will be required. Table 12.16 on page 746 from "Digital Control of Dynamic Systems" 2nd edition by Franklin, Powell, and Workman, summarizes the required resolution for each state variable and emphasizes the requirement of 32 bit processing. There have been essentially two hardware approaches relevant to the present invention taken in the prior art to implement the 32 bit processing used by servo control systems for the state estimator method.

One approach is exemplified by the Seagate 2.5" products, for example the SGT9550A, which utilize two processors. The first processor is a 32 bit precision DSP processor, the Texas Instruments TMS320C10, which is used to implement the control code to control the actuator of the VCM. The second processor is an 8 bit microcontroller which is used for interfacing the DSP to the disk drive and also interfacing the disk drive to the host system. For smaller form factor drives, such as 1.8" drives, using two processors presents substantial problems: (1) two separate processors require too much space, leaving even less space for other processing circuits, (2) combining the two processors in an ASIC is a very expensive proposition, and (3) using both a stand alone 32 bit precision DSP and a microcontroller is a relatively expensive device solution to use in a commodity-type commercial product' such as a disk drive where margins are thin.

A second 32 bit processing approach found in the prior art is exemplified by the Western Digital 2.5" disk drive products, for example WDAC 2170. These systems employ a single non-DSP processor, the Intel 196KC for both servo system control and controller interface codes. The Intel 196KC uses 32 bit precision for the servo control code, but the multiplier is about 10 times slower than that found in a typical DSP. This degrades servo controller performance by introducing a longer computation delay, which is defined as the time interval from the servo burst interrupt until the new control signal is sent to the D/A converter. In addition, the data throughput is significantly degraded because the Intel 196KC splits time between the servo control calculation and the interface controller function. This approach results in increased seek time, one of the most critical specifications in a disk drive along with price, capacity and size.

It is well known in the art of disk drive manufacturing that the predominate objectives are to make disk drives which are smaller, have higher capacity, have faster seek times and have a lower cost. As discussed above, these objectives are often at odds with each other. Higher capacity and the increased accuracy of the state estimator method has set the standard for servo control processing at 32 bits which is at odds with size requirements and cost as exemplified by the Seagate 2.5" products or performance as exemplified by the Western Digital 2.5" products.

SUMMARY OF THE INVENTION

According to the present invention, a state estimator method is used to servo control the movement of a head across a disk surface in a data recording disk file during track seeking (defined as occurring when the current position of the head is more than ½ track away from the target position of the head) and to maintain the head over a target track during track following (defined as occurring when the current position of the head is less than ½ track away from the target position of the head). As the head moves across the disk surface, the head samples (reads) servo control information from the disk surface at a specified interval which is input into the state estimator method. The servo information is recorded as radially repetitive bands of a fixed number of uniquely identifiable concentric tracks either as continuous tracks on a dedicated servo disk surface or as sectors of tracks on the disk surface or as a combination of continuous tracks on a dedicated servo disk surface and sectors of tracks. The servo information input to the state estimator method is a track number and a position error signal (PES) representative of a position of the head relative to a centerline of a nearest track.

For each servo information sample, the state estimator method predicts the position, velocity and bias of the data head to effectuate accurate servo control by estimating an error between a measured position of the head and the predicted position of the head. The predicted data head position is a relative position of the data head based upon the difference between a current data head position and a target data head position. These predictions are made using a set of constants based on the physical parameters of the disk file which include the head, an actuator which positions the head to a centerline of a target track during track seeking and maintains the head over the centerline of the target track during track following in response to a signal from the state estimator, and a support arm assembly which connects the head to the actuator. In the present invention, one of at least three different sets of constants are used to make the predictions of the relative position, velocity and bias of the head. As the head approaches the target track, the set of constants used to make these predictions change at selected radial distances from the target track.

For each servo information sample, the estimated error in the head position is calculated, and a digital VCM control signal is formed from the estimated error and a precalculated value formed during the previous servo information sample. The digital VCM control signal is then converted to an analog VCM control signal which is input to a VCM driver which supplies current to the VCM. The predictions of the relative position, velocity, and bias of the data head at the time of the next servo information sample are then calculated. The predicted relative head position at the time of the next servo information sample is then examined to see if the set of constants need to be changed. If so, the set of constants is changed to those corresponding to the distance represented by the predicted relative head position, and the predictions of the relative position, velocity, and bias of the head at the time of the next servo information sample are rescaled to form the predicted relative position, velocity, and bias of the data head at the time of the next servo information sample. If the head is track seeking, the precalculated value to be used during the next servo information sample is formed as a function of an adjusted predicted velocity of the data head and predicted bias of the data head at the time of the next servo information sample. If the head is track following, the precalculated value to be used during the next servo information sample is formed as a function of the predicted relative position, velocity, and bias of the data head at the time of the next servo information sample.

OBJECTS AND ADVANTAGES

Accordingly, it is an object of the present invention to implement a servo control system for controlling a data head in a disk file system with a state estimator method which utilizes one or more processors capable of less than M+N bit processing, where M represents the number of bits needed to represent all of the data tracks on the disk surface and N is the number of bits required by the PES in track following.

Another object of the present invention is to provide an improved servo control system for high capacity disk file systems which is fast, relatively inexpensive, accurate and precise.

Another object of the present invention is to provide an improved servo control system for high capacity disk file systems which achieves the speed, accuracy and precision of systems using 32 or more bit precision digital processors while using only one or more 16 bit processors.

Another object of the present invention is to provide an improved servo control system for high capacity disk file systems which is able to employ relatively low cost 16 bit processors in lieu of more expensive 32 bit processors by making use of a multimodal servo system which predicts the relative data head position, the data head velocity and the data head bias.

Accordingly, it is an object of the present invention to implement a servo control system for controlling a data head in a disk file system with a state estimator method which is able to employ relatively low cost 16 bit processors in lieu of more expensive 32 bit processors by making use of a multi-modal servo system which predicts the relative data head position, the data head velocity and the data head bias.

These and many other objects and advantages of the present invention will became apparent to those of ordinary skill in the art from a consideration of the drawings and ensuing description of the invention.

DESCRIPTION OF THE PREFERRED EMBODIMENTS

Figure 1:
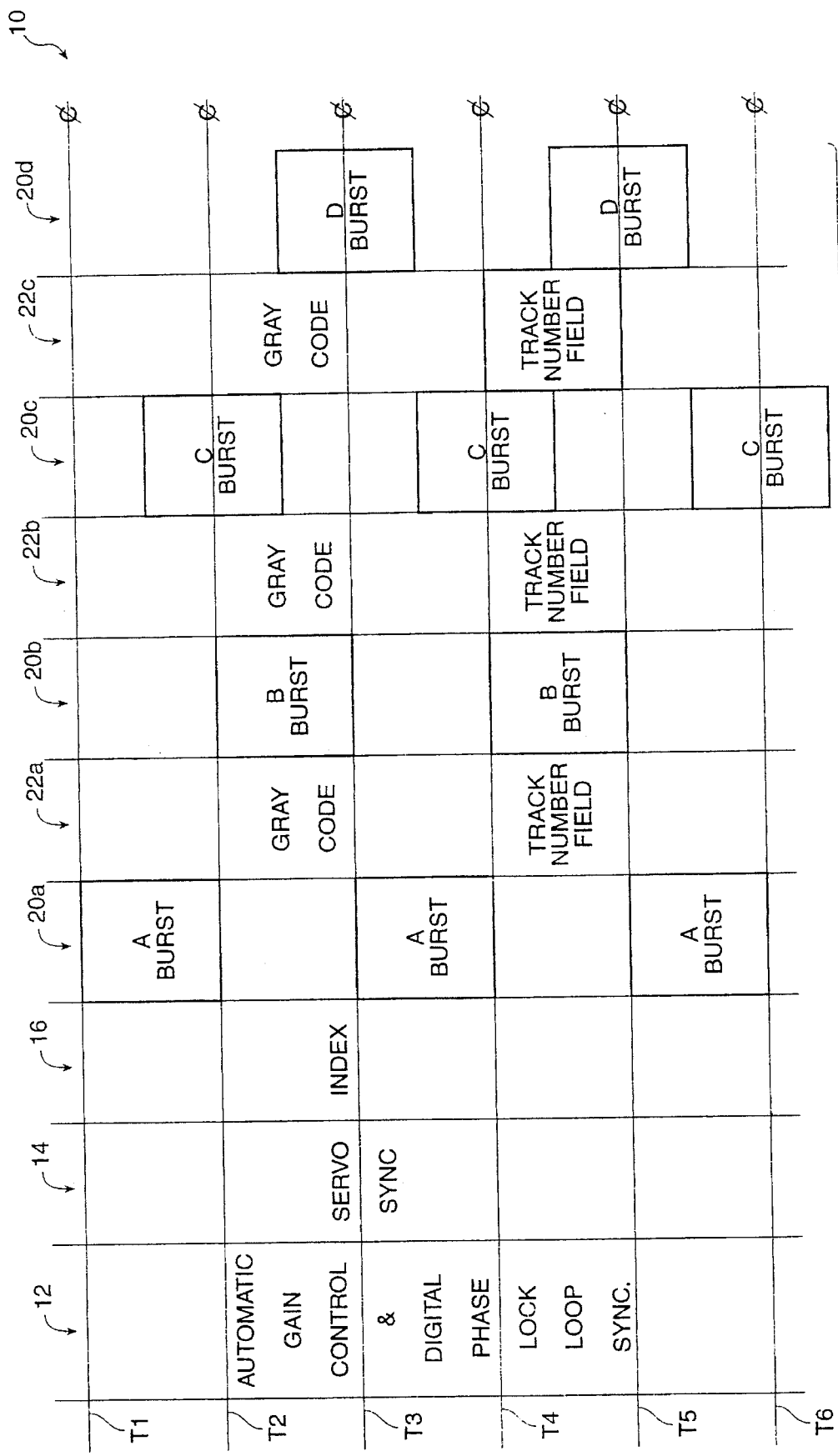
FIG. 1 is a schematic diagram illustrating the servo pattern provided in each servo sector of a recording surface of the disks according to a presently preferred embodiment of the present invention.

Those of ordinary skill in the art will realize that the following description of the present invention is illustrative only and is not intended to be in any way limiting. Other embodiments of the invention will readily suggest themselves to such skilled persons from an examination of the within disclosure.

The present invention may be used with a number of existing types of disk drives known to those of ordinary skill in the art and is not intended to be otherwise limited. For example, the present invention may be used virtually unmodified with disk drives using separate read and write heads including disk drives using magnetoresistive technology. The present invention may be used with dedicated servo surface servo control systems or servo sector servo control systems or a combination thereof as is well known in the art, in order to obtain data head position information. Finally, while most references herein are to 16 bit processors, as they are readily commercially available and relatively inexpensive, this does not mean that the present invention would not work with other configurations where available. Specifically, the present invention is directed to implementing a multimodal servo control system with a state estimator method wherein the number of bits required in the processors used by the servo control system is less than M+N, where M represents the number of bits needed to represent all of the data tracks on the disk surface and N is the number of bits required by the PES in track following.

In disk drive systems, the radial movement of the data head across the disk surface is controlled by a servo control system which determines the amount of current to be applied to a VCM which drives a support arm assembly to which the data head is attached. Supplying current to the VCM causes the data head to be repositioned. In the present invention, the servo control system uses a state estimator method to determine the amount of current to be applied to the VCM.

The state estimator method is preferable over PID control in servo control systems, because many of the servo system dynamics described above can be accurately accounted for by the state estimator method. It has been the view in the art that 32 bit or higher processing is necessary to effectively implement the state estimator method for servo control systems. This is due in part to the view that the predicted position of the data head used by the state estimator method requires a high degree of accuracy to be effective. Unfortunately, 32 bit processing implementations present size and cost or speed problems. Unlike prior art applications of state estimator methods to high density disk drives, the state estimator method of the present invention uses 16-bit processing.

In order to implement the state estimator method of the present invention using 16-bit processing, the servo control system of the present invention uses relative addressing and is a multimodal system having three operating modes. Although those of ordinary skill in the art will readily recognize that additional intermediate modes could be used as well. The first mode is called coarse seek, the second mode is called fine seek, and the third mode is called track following. A fourth (or greater) mode intermediate coarse seek and fine seek could, for example, be added if desired. The selection of the operating mode of the servo control system is made based on the difference in position between a current position of the data head and a target position of the data head. A change in the operating mode of the servo control system results in changes to the values of the constants used by the state estimator method and to the form of the content of the data head position information supplied to the state estimator method. These dynamic changes, corresponding to a change in the operating mode of the servo control system, made as the data head moves toward a target position on the disk surface, permit the state estimator method to be implemented using 16-bit processing.

In the presently preferred embodiment, if the difference in position is greater than 64 data tracks the servo control system will select the coarse seek operating mode, if the difference in position is between ½ track and 64 tracks the servo control system will select the fine seek operating mode, and if the difference in position is less than ½ track then the servo control system will select the track following operating mode. It should be appreciated that the servo control system may be implemented using more than three operating modes, and that the range of track numbers associated with each servo operating mode is a matter of servo system design choice. It is also a matter of design choice as to when operating modes should be changed, e.g., immediately after crossing a boundary, like the 64 track-to-go boundary, or at some convenient time after that event when the track-to-go number might actually be 63 or 62 or some other number. Accordingly, a boundary other than 64 tracks-to-go could also be used, as desired.

In order to obtain the position of the data head on the disk surface according to a presently preferred embodiment of the present invention, a disk file having a plurality of concentric data tracks on which information may be stored is provided with a servo sector control system using A, B, C, and D servo burst information as well as track number fields which are preferably prerecorded on the disk surface at the factory. Such systems are well known to those of ordinary skill in the art. FIG. 1 is a schematic diagram illustrating a preferred embodiment of a servo sector pattern recorded on the disk surface. Those of ordinary skill in the art will recognize that other arrangements of the servo sector information are possible, including the number of servo bursts used, and that other of these embodiments could be employed in the present invention.

In FIG. 1, the servo sector pattern 10 is composed of several sections as is well known in the art. The first section is automatic gain control (AGC) and digital phase lock loop (DPLL) synchronization 12. The AGC provides constant output amplitude for the servo sector information detected by the R/W channel and the DPLL generates a clock which is phase with the servo sector information which is used to demodulate the digital data of the servo sector pattern 10.

The second section is the servo sync 14. The servo sync 14 is used to provide timing to gate the servo bursts and for demodulating the digital data including the Gray code, and is in the preferred embodiment the pattern 011110. The servo sync field 14 can be as simple as a DC erase. The next section is the index field 16 which is used to support controller functions related to the data sectors on the disk surface. In the preferred embodiment, a valid index field 16 is indicated by the digital bit pattern 1000.

The next portion of the servo sector is a position indication section 18 which includes servo bursts A through D 20a, 20b, 20c and 20d, and track number fields 22a, 22b and 22c arranged in the following pattern: servo burst A 20a, track number field 22a, servo burst B 20b, track number field 22b, servo burst C 20c, track number field 22c, and servo burst D 20d. The track number fields 22a, 22b and 22c are prerecorded with a Gray code format. Gray code format is an non weighted encoding scheme well known to those of ordinary skill in the art for encoding a pattern of 1's and 0's. The pattern of the position indicator section 18 having servo bursts A through D 20a–20d interlaced with track number fields 22a–22c is designed to improve the accuracy of the position signal detection and to minimize the number of signals used to convey the data head position information without increasing the length of the servo sector pattern 10.

The servo bursts A through D 20a–20d are used to generate a position error signal (PES). The PES represents the off track amount of the data head from the track centerline within a ½ track width distance, thus, giving the position of the data head within the data track over which it is flying. The track number fields 22a–22c are combined to form the data track number over which the data head is flying.

Figure 2:
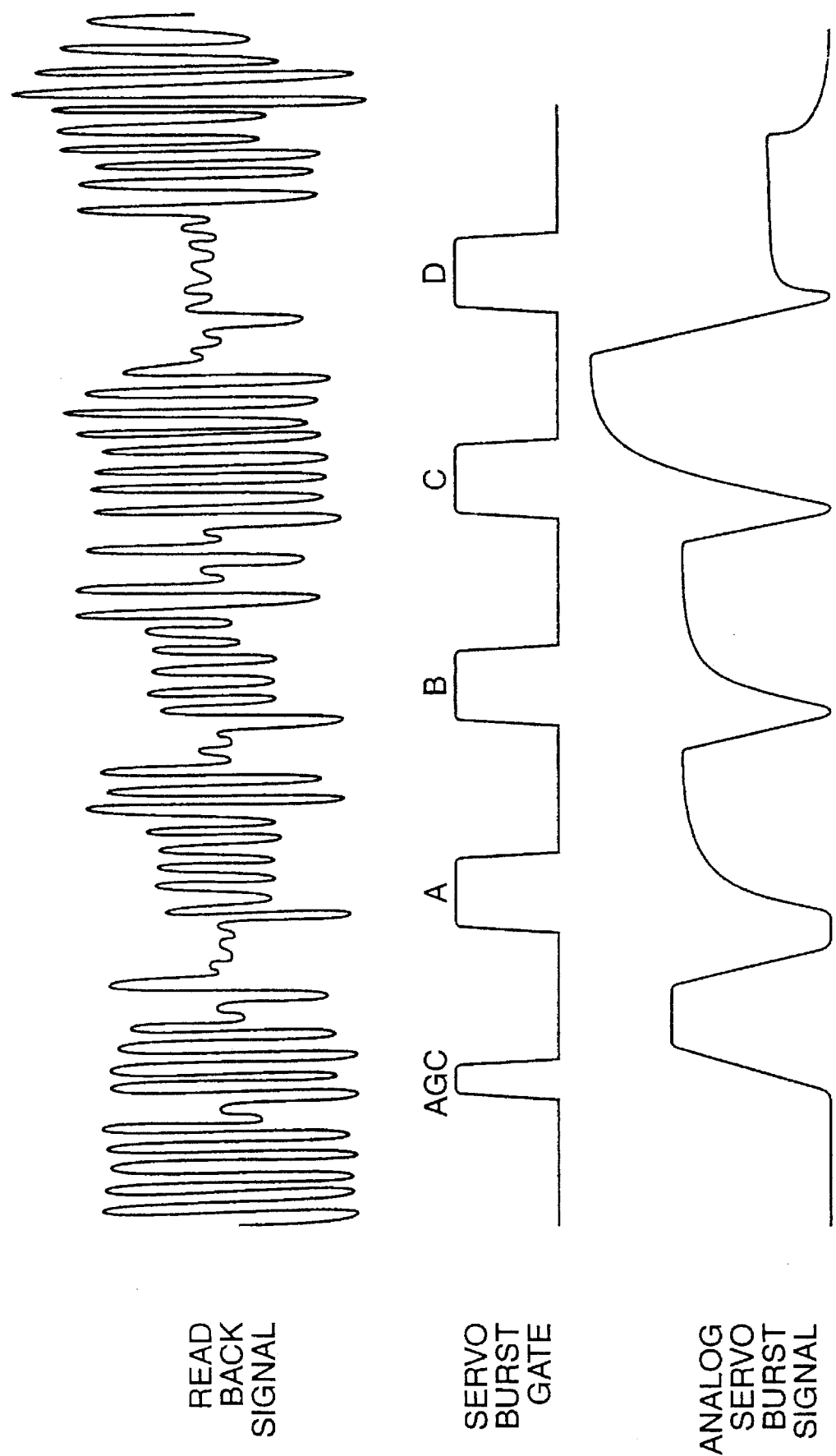
FIG. 2 shows the analog servo burst signal from the read/write channel according to a presently preferred embodiment of the present invention.
Figure 3:
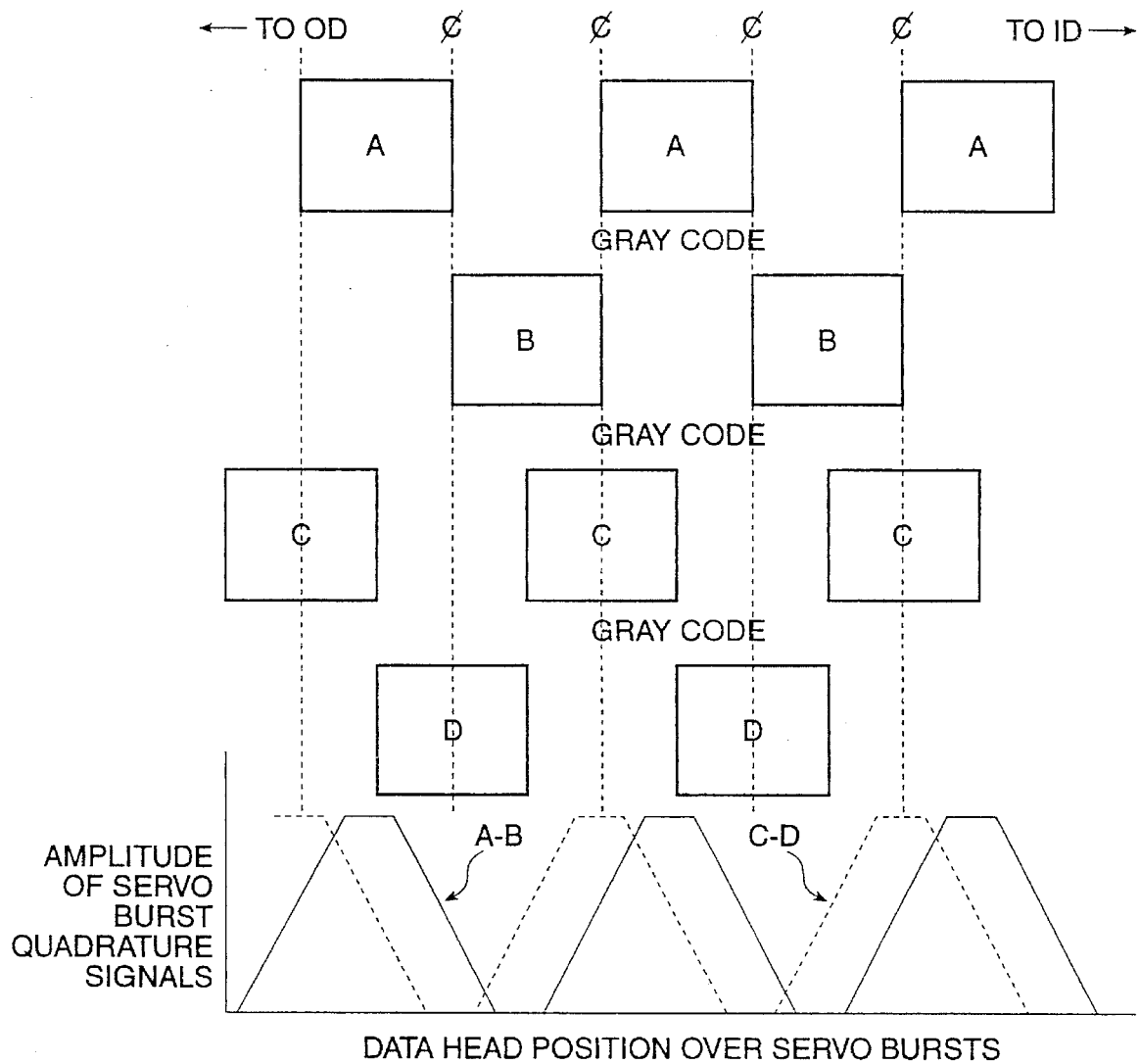
FIG. 3 shows the amplitudes of the servo burst quadrature signals A-B and C-D as a function of the position of the data head over the servo burst signals according to a presently preferred embodiment of the present invention.

FIG. 2 shows the analog servo bursts A through D. As the head moves across the servo sector pattern a signal from the servo bursts A through D are captured serially by the R/W channel. As each of the servo bursts A through D is captured it is converted to a digital signal by a single ND converter before the next servo burst is captured. The amplitudes of the servo bursts A through D are detected to generate the quadrature A-B and C-D signals shown in FIG. 3. For the servo burst pattern shown in FIG. 3, the track center line of even track numbers is the point at which A-B is equal to zero and C-D is a maximum. Similarly, the track center line of odd track numbers is also the point at which A-B is equal to zero, but where C-D is the minimum. It can be further seen that A-B and C-D are intersected at about ¼ track away from the track center line.

A method for determining the PES as is presently preferred using four servo bursts is as follows. If the quadrature A-B signal is greater than the quadrature C-D signal, and the A-B quadrature signal indicates that the head is off track center by less than ¼ of a track, then the PES is −(A-B). Otherwise, the PES is −(C-D). On the other hand, if the quadrature signal A-B is less than the quadrature signal C-D, and the C-D quadrature signal is less than ¼ of a track, then the PES is (C-D). Otherwise, the PES is (A-B)

Figure 4:
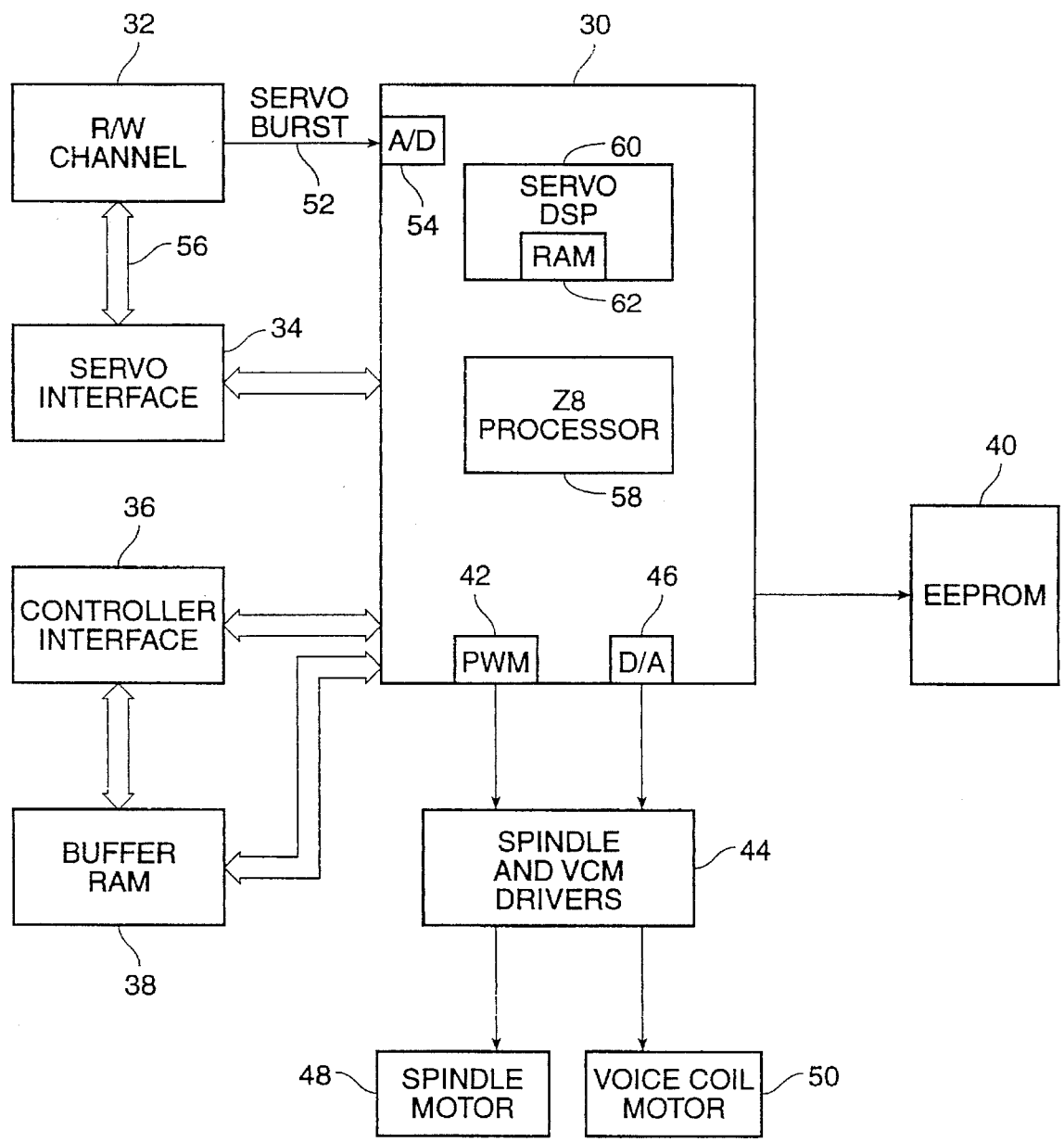
FIG. 4 is a block diagram of several hardware features used by the servo control system according to a presently preferred embodiment of the present invention.

A block diagram of some of the hardware used by the servo control system is shown in FIG. 4. As shown, a CPU 30 receives servo burst information from a read/write (R/W) channel 32 and communicates with a servo interface module 34, a controller interface module 36, a buffer RAM 38 and an EEPROM 40. A pulse width modulator (PMW) 42 in the CPU 30 conveys a spindle control signal to a spindle driver in the spindle and VCM driver module 44. A digital-to-analog converter (D/A) 46 in the CPU 30 converts a digital VCM control signal to an analog VCM control signal. The analog VCM control signal is communicated to a VCM driver in the spindle and VCM driver module 44.

The VCM driver in the spindle and VCM driver module 44 is a transconductance amplifier well known to those of ordinary skill in the art. The spindle and VCM drivers in the spindle and VCM driver module 44 supply current to a spindle motor 48 and a VCM 50, respectively. The CPU 30 is connected to the R/W channel 32 by a single analog channel 52. A single ND converter 54 in the CPU 30 receives the analog servo bursts through the single analog channel 52 and converts the analog servo bursts to the digital signals used to determine the PES.

Use of the single analog channel 52 for the burst amplitude detection improves the accuracy of the measured position of the data head by automatically canceling the DC offset among the servo bursts which would be present if separate sample and hold circuits were employed for each of the servo bursts. Single analog channel 52 also minimizes the hardware complexity because only one sample and hold capacitor and one pin out are required from the R/W channel 32. The minimized hardware complexity of the single analog channel 52 and the single ND converter 54 may be used by the circuit designer to reduce the circuit size for smaller form factor disk drives.

The servo interface module 34 is connected to the R/W channel 32 by a digital channel 56. The digital channel 56 passes the data track number information from the R/W channel 32 to the servo interface module 34 which then conveys the track number to the CPU 30. Employing a separate digital channel 56 for the track number fields permits the track number fields to be decoded by the servo interface module 34. The servo interface module 34 performs the function of interfacing the R/W channel 32 to the CPU 30 while the ND converter 54 is converting servo burst amplitudes from analog to digital values.

According to a presently preferred embodiment, the CPU 30 is a Zilog Model Z86C95 which includes in a single package a conventional 8/16 bit Z8 processor 58 and a 16-bit DSP core 60 with limited random access memory (RAM) 62. The Z8 processor 58 has a variety of tasks which include interfacing with servo interface module 34 and the host system, and providing support to the DSP core 60. Among other tasks, the DSP core 60 is used to execute the servo controller code. Unlike other prior art implementations of state estimator methods which use 32-bit or higher processing. The control system of the present invention uses the 16-bit processing of the Z86C95 to implement the state estimator method of the present invention.

In comparison to the two package design described above for the Seagate 2.5" drive, the single package CPU 30 Zilog Z86C95 takes up less space, while being able to implement the state estimator method of the present invention using 16-bit processing. Thus, achieving the objective of saving space, without loss of performance. This is in contrast to the Western Digital 2.5" drive, described above, which uses a single package, but suffers from performance problems in attempting to implement 32 bit processing without a DSP core. In addition to the space savings achieved by using the Zilog Z86C95, the amount of power used by the CPU 30 is minimized because the Zilog Z86C95 has a very limited instruction set (14 instructions). The size of the instruction set of a CPU affects the amount of power consumed, because generally, the execution time for a single instruction from a limited instruction set is less than the execution time of a single instruction from a more complex instruction set.

According to the presently preferred embodiment of the present invention, the servo sector information is read from the disk surface and conveyed to the CPU 30 of the servo control system. The servo sector information is sampled approximately every 210 µs. The amount of time between successive servo sector samples is known in the art as the servo sampling time, T. In the present invention, the amount of time from when the servo information is sampled until the analog VCM control signal is applied to the VCM driver in the spindle and VCM driver module 44 is defined as the computation delay, $t_d$.

The sampling of the servo information every 210 µs is controlled by a counter/timer circuit in the Z8 58 which the Z8 58 synchronizes with the servo sector information when the servo control system is initialized. The counter/timer circuit generates a digital signal known as a servo sector interrupts. The servo sector interrupts instruct the DSP 60 to read the servo bursts A through D 20a–20d and the Z8 58 to provide to the DSP 60 the track number derived from the track number fields 22a–22c as shown in FIG. 1. The servo bursts A through D 20a–20d are used by the DSP 60 to determine the PES.

Figure 5:
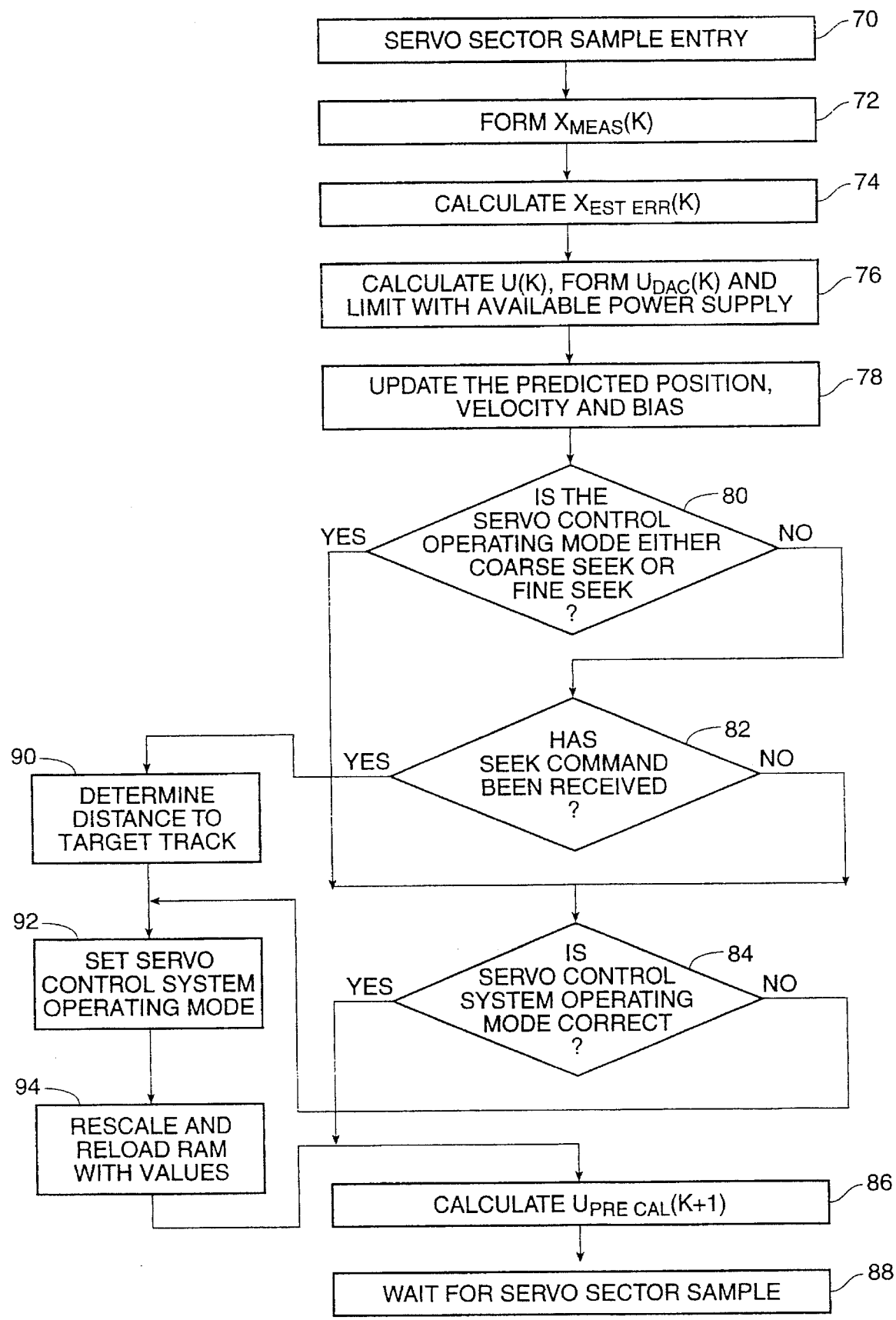
FIG. 5 is a flow chart of the state estimator method implemented by the servo control system according to a presently preferred embodiment of the present invention.

Once the servo sector information has been sampled, the servo control system begins the state estimator method. FIG. 5 presents a flow chart of the servo control system using the state estimator method according to a preferred embodiment of the present invention.

Attached hereto is a Microfiche Appendix in accordance with 37 C.F.R.§1.96. It contains an actual presently preferred embodiment of the microcode used to implement the servo control system described in the flow chart of FIG. 5 using a ZILOG Z86C95 processor having a Z8 processor 58 and a DSP core 60. Pages 1–16 are the Z8 58 support for the DSP 60, and pages 17–32 are the full motion control of the VCM 50 by the DSP 60. Pages 1–4 are declarations used by the Z8 58. Pages 4–6, read Gray code, check the status of the DSP 60, and transfer the Gray code to the DSP 60. Pages 7–8 checks the operating modes, switches operating modes and rescales. Pages 8–12 provide jump vectors for servo control operating modes. Pages 12–16 initialize the DSP 60 with servo control system operating modes. Pages 17–19 are declarations used by the DSP 60. Pages 20–25 calculate the estimated error in position and calculate the control signal for the D/A 46. Pages 26–28 calculate predictions of position, velocity and bias of data head for the next servo sector sample. Pages 29–32 calculate precalculated value for the next servo sector sample.

In the description of FIG. 5, reference will be made to the FIG. 4. In the state estimator method to be described with reference to FIG. 5 a number of different state estimator constants are used which are determined, as will be disclosed, from disk drive parameters associated with the operation of the disk drive system.

The disk drive parameters are combined into a term $K_{plant}$ which is calculated as follows:

$$K_{plant} = K_d K_p K_T K_x K_a r / j S_f$$

In a specific example of the application of the state estimator method of the present invention to a disk drive system to follow, the value of $K_{plant}$ is 2.6798E7 in the coarse seek and fine seek modes and 8.7831E6 in track following mode.

The disk drive parameter, $K_d$, is associated with the output voltage of the D/A 46. The value of $K_d$ is the portion of the output voltage swing of the D/A 46 represented by each level of resolution of the D/A 46 known in the art as D/A counts. In the specific example to follow, the output voltage swing of the D/A 46 is 2 volts and the resolution of the D/A is 1 in 256. Accordingly, $K_d$ is 2 volts divided by 256, which equals 0.0078125 volts per D/A count.

The disk drive parameter, $K_p$, is the gain of the of the VCM driver in the spindle and VCM driver module 44. The value of $K_p$ is a matter of design choice, based on the resolution of the predicted relative position, predicted velocity and predicted bias of the data head provided in different servo control system operating modes. In the example to follow, $K_p$ is 108.6 mAmps per volt in the coarse seek and fine seek modes and 35.6 mAmps per volt in the track following mode. The design of the transconductance amplifier for the VCM driver to have the desired gains, $K_p$, is well within the skill of those of ordinary skill in the art. The value of $K_p$ is reduced during the track following operating mode to minimize quantization error.

The disk drive parameter, $K_T$, is the VCM torque constant in N.m per Amp. The value of $K_T$ may be readily measured by one of ordinary skill in the art by applying a constant current to the VCM, with the VCM starting at rest, and then measuring the angular distance traveled by the VCM for a predetermined amount of time. From the measured angular distance and the predetermined amount of time, the angular acceleration of the VCM may then be calculated by well known methods. From the angular acceleration the torque constant can be determined using the VCM inertia (calculated as the disk drive parameter, j, in a separate step) and the constant applied current. In the example to follow, $K_T$ is 0.0118 N.m per Amp.

The disk drive parameter, j, is the VCM inertia in Kg.m$^2$. The value of j may be readily calculated by one of ordinary skill in the art by using the mass of the head, the VCM and the support arm assembly, and the position of the mass of the head, the VCM and the support arm assembly with respect to the position of the pivot point of the support arm assembly. Methods for calculating the inertia of a moving object are well known to those of ordinary skill in the art. In the example to follow, j is 1.69E-7 Kg-m$^2$.

The disk drive parameters, r and $K_x$, are the distance on the support arm assembly from the pivot point to the head and the number of tracks on the disk surface per meter, respectively. As well understood by those of ordinary skill in the art, the values of r and $K_x$ are largely a matter of design choice, based upon such design considerations as the size requirements of the disk drive and the desired storage capacity of the disk drive. In the example to follow, r is 0.026416 meters and $K_x$ is 138858 tracks per meter.

The disk drive parameter, $K_a$, represents the resolution provided by the number of bits allocated to the PES in track following. In the example to follow, the number of bits allocated to the PES in track following is 11. Accordingly $K_a$ is $2^{11}$=2048.

The term, $S_f$, is a scale factor which is used to minimize the quantization effect on the value of the digital VCM control signal being conveyed from the DSP 60 to the D/A 46.

Referring now to FIG. 5, at step 70, a servo sector sample is received by the CPU 30. Next at step 72, a relative position of the data head, $x_{meas}(k)$, is formed by subtracting the current track number from the target track number and then combining this difference with the PES. According to a presently preferred embodiment of the present invention, in each of the three servo operating modes the bit allocation of the relative position of the data head, $x_{meas}(k)$, is different.

The formats for the bit allocation of the relative position of the data head, $x_{meas}(k)$, for each of the three servo control system operating modes are given as follows, wherein T corresponds to a bit allocated to track number description, P indicates a bit allocated to the PES and S indicates a sign bit:

|     | S | T | T | T | T | T | T | T | T | T | T | T | P | P | P | P | for the coarse seek mode |
| --- | - | - | - | - | - | - | - | - | - | - | - | - | - | - | - | - | --- |
| bit | 0 | 1 | 2 | 3 | 4 | 5 | 6 | 7 | 8 | 9 | 10 | 11 | 12 | 13 | 14 | 15 | |
|     | S | T | T | T | T | T | T | T | P | P | P | P | P | P | P | P | for the fine seek mode |
| bit | 0 | 1 | 2 | 3 | 4 | 5 | 6 | 7 | 8 | 9 | 10 | 11 | 12 | 13 | 14 | 15 | |
|     | S | T | T | T | T | P | P | P | P | P | P | P | P | P | P | P | for the track following mode |
| bit | 0 | 1 | 2 | 3 | 4 | 5 | 6 | 7 | 8 | 9 | 10 | 11 | 12 | 13 | 14 | 15 | |

It can be seen from this bit allocation for the relative position of the data head, $x_{meas}(k)$, that as the difference in the position between the current position of the data head and the target track of the data head becomes smaller, the number of bits in the relative position of the data head, $x_{meas}(k)$, allocated to the track number decreases and the number bits allocated to the PES increases. This reallocation of bits minimizes the position uncertainty as the difference in the position between the current position of the data head and the target track of the data head decreases.

Allocating a number of bits to provide a description of the PES, which is not the same at all times and which is fewer, during track seeking, than the number of bits required to provide the resolution needed by the state estimator during track following, is a wide departure from prior art implementations of state estimator methods. In the present invention, as the data head moves closer to the target track more bits are allocated to the PES, and the servo control system operating mode is changed to account for the changing accuracy of the relative position of the data head, $x_{meas}(k)$. Accordingly, the servo control system is able to implement the full state feedback control law based on the state estimator method using only 16-bit processing.

Next at step 74, the DSP 60 calculates an estimated error, $x_{est\ err}(k)$, by subtracting a predicted relative position of the data head, $\bar{x}_1(k)$, from the relative position of the data head, $x_{meas}(k)$. The predicted relative position of the data head, $\bar{x}_1(k)$, was calculated in a step in the state estimator method, yet to be described, during the execution of the state estimator method for a previous servo sector sample. In the state estimator method, the predicted relative position of the data head, $\bar{x}_1(k)$, is a prediction of the relative position of the data head which is calculated using constants representing the disk drive parameters.

The estimated error, $x_{est\ err}(k)$, represents an estimate of the error in the predicted relative position description of the data head, $\bar{x}_1(k)$. The use of the predicted relative position of the data head, $\bar{x}_1(k)$, is a substantial departure from PID control, which does not predict the relative position of the data head, and results in substantially improved disk drive performance over prior art systems using PID control and/or only 16-bit processing. The DSP 60 determines the estimated error, $x_{est\ err}(k)$, according to the following equation.

$$x_{est\ err}(k) = x_{meas}(k) - \bar{x}_1(k)$$

Next at step 76, the estimated error, $x_{est\ err}(k)$, is multiplied by an estimated error gain constant, $k_{est\ err}$, and subtracted from a precalculated value, $u_{pre\ cal}(k)$, to form a digital VCM control signal, $u(k)$. The precalculated value, $u_{pre\ cal}(k)$, was calculated, in a yet to be described step, in the state estimator method, during the execution of the state estimator method for a previous servo sector sample. The digital VCM control signal, $u(k)$, is calculated according to the following equation.

$$u(k) = u_{pre\ cal}(k) - k_{est\ err} x_{est\ err}(k)$$

Since the DSP 60 has an output of 16 bits and the D/A 46 is 8 bits wide, only 8 bits of the 16 bit digital VCM control signal, $u(k)$, will be conveyed to the D/A 46. The selection of 8 bits of the digital VCM control signal, $u(k)$, from the full 16 bits of the digital VCM control signal, $u(k)$, is known as normalization. In the preferred embodiment of the invention, the middle 8 bits of the digital VCM control signal, $u(k)$, are selected. Accordingly, the digital VCM control signal, $u(k)$, is multiplied by a VCM control signal gain constant, $k_{gain}$, which is chosen to perform a right shift of 4 bits in the digital VCM control signal, $u(k)$, to form a normalized digital VCM control signal $U_{dac}(k)$, which is calculated according to the following equation:

$$u_{dac}(k) = k_{gain} u(k)$$

In order to optimize the performance of the servo control system, the value of the estimated error gain constant, $k_{est\ err}$, is different in each of three servo control system operating modes. In the preferred embodiment, the value of the digital VCM control signal constant, $k_{gain}$, is the same in each of three servo control system operating modes, although it could also be different in each of the servo control system operating modes. The value of the digital VCM control signal constant, $k_{gain}$, and the three different values of the estimated error gain constant, $k_{est\ err}$, are stored in the EEPROM 40.

The values of the estimated error gain constant, $k_{est\ err}$, and the digital VCM control signal constant, $k_{gain}$, associated with the current servo control operating mode, were loaded by the Z8 58 from the EEPROM 40 and stored in the RAM 62 of the DSP 60 when either the servo control system was initialized or following a change in the servo control system operating mode. For example, following a change in the operating mode of the servo control system, the estimated error gain constant, $k_{est\ err}$, associated with the updated servo control operating mode, is loaded from the EEPROM 40 by the Z8 58 into the same location in the RAM 62 of the DSP 60 as the estimated error gain constant, $k_{est\ err}$, of the former servo control system operating mode.

The estimated error gain constant, $k_{est\ err}$, is calculated as function of state estimator method constants which will be more fully described below. In the coarse seek operating mode and the fine seek operating mode the estimated error gain constant, $k_{est\ err}$, is calculated as follows.

$$k_{est\ err} = k_2(L_2 - F_{23}L_3) + k_3 L_3$$

In the track following operating mode the estimated error gain constant, $k_{est\ err}$, is calculated as follows.

$$k_{est\ err} = k_1(L_1 - F_{12}(L_2 - F_{23}L_3) - F_{13}L_3) + k_2(L_2 - F_{23}L_3) + k_3 L_3$$

Each of the coefficients $k_1$, $k_2$ and $k_3$, $L_1$, $L_2$ and $L_3$, and $F_{12}$, $F_{13}$ and $F_{23}$ are elements of the controller gain matrix K, the estimator gain matrix L and the matrix $\Phi$ from the discrete mathematical model of the state estimator, respectively. The values of the coefficients $k_1$, $k_2$ and $k_3$, $L_1$, $L_2$ and $L_3$, and $F_{12}$, $F_{13}$ and $F_{23}$ are state estimator method constants. Each of these matrices and the values associated with their elements will be explained in greater detail below.

The estimated error gain constant, $k_{est\ err}$, is a gain constant which has been introduced into the calculation of the digital VCM control signal, $u(k)$, in order to minimize the computation delay, $t_d$. By employing the estimated error gain constant, $k_{est\ err}$, most of the calculations in the state estimator method may be performed after the DSP 60 has conveyed the normalized digital VCM control signal, $u_{dac}(k)$, to the D/A 46, thus, minimizing the computation delay, $t_d$, and improving the performance of the servo control system.

Continuing at step 76, the DSP 60 then limits the normalized digital VCM control signal, $u_{dac}(k)$, to be within the resolution of the full swing output voltage (2 volts) available from the D/A 46 before conveying the normalized digital VCM control signal, $u_{dac}(k)$, to the D/A 46. The D/A 46 converts the normalized digital VCM control signal, $u_{dac}(k)$, to an analog VCM control signal. The VCM driver of the spindle and VCM driver module 44 supplies current to the VCM 50 based on the analog VCM control signal.

Next at step 78, the relative predicted position, $\bar{x}_1(k+1)$, predicted velocity, $\bar{x}_2(k+1)$, and predicted bias, $\bar{x}_3(k+1)$, of the data head, at the time of the next servo system sample are calculated by the DSP 60 using the following equations.

$$\bar{x}_1(k+1) = \bar{x}_1(k) + F_{12}\bar{x}_2(k) + F_{13}\bar{x}_3(k) + L_1 x_{est\ err}(k) + G_{11} u(k-1) + G_{21} u(k)$$

$$\bar{x}_2(k+1) = \bar{x}_2(k) + F_{23}\bar{x}_3(k) + L_2 x_{est\ err}(k) + G_{12} u(k-1) + G_{22} u(k)$$

$$\bar{x}_3(k+1) = \bar{x}_3(k) + L_3 x_{est\ err}(k)$$

The equations of the predicted relative position, $\bar{x}_1(k+1)$, predicted velocity, $\bar{x}_2(k+1)$, and predicted bias, $\bar{x}_3(k+1)$, of the data head, are based on the discrete mathematical model of the state estimator given by the following matrix equation:

$$X(k+1) = \Phi X(k) + \Gamma_1 u(k-1) + \Gamma_2 u(k)$$

which is discussed in chapter 2 of "Digital Control of Dynamic Systems" 2nd edition by Franklin, Powell and Workman and which is hereby incorporated herein by reference.

Each of the coefficients $F_{12}$, $F_{13}$ and $F_{23}$, $G_{11}$ and $G_{12}$, and $G_{21}$ and $G_{22}$ in the above equations of the predicted relative position, $\bar{x}_1(k+1)$, predicted velocity, $\bar{x}_2(k+1)$, and predicted bias, $\bar{x}_3(k+1)$, of the data head, are elements of the matrices $\Phi$, $\epsilon_1$ and $\epsilon_2$ in the discrete mathematical model of the state estimator, respectively, given as follows.

$$\Phi = \begin{vmatrix} 1 & F_{12} & F_{13} \\ 0 & 1 & F_{23} \\ 0 & 0 & 1 \end{vmatrix}$$

$$\Gamma_1 = \begin{vmatrix} G_{11} \\ G_{12} \\ 0 \end{vmatrix}$$

$$\Gamma_2 = \begin{vmatrix} G_{21} \\ G_{22} \\ 0 \end{vmatrix}$$

The elements $F_{12}$, $F_{13}$ and $F_{23}$, $G_{11}$ and $G_{12}$, and $G_{21}$ and $G_{22}$ of the matrices $\Phi$, $\epsilon_1$ and $\epsilon_2$, respectively, are functions of $K_{plant}$, calculated from the disk drive parameters $K_d$, $K_p$, $K_T$, $K_x$, $K_a$, r, j and $S_f$, the sampling time T, and computation delay time $t_d$, and are calculated as follows:

$F_{12}=1$ $F_{13}=K_{plant}T^2/2$ $F_{23}=K_{plant}T^2$ $G_{11}=K_{plant}((2Tt_d-t_d^2)/2)$ $G_{12}=K_{plant}Tt_d$ $G_{21}=K_{plant}(T-t_d)^2/2$ $G_{22}=K_{plant}T(T-t_d)$ As the servo control system changes operating modes, many of the values of the elements $F_{12}$, $F_{13}$ and $F_{23}$, $G_{11}$ and $G_{12}$, and $G_{21}$ and $G_{22}$ of the matrices $\Phi$, $\epsilon_1$ and $\epsilon_2$, respectively, will be different for each of the three different operating modes. Each of the values of the elements $F_{12}$, $F_{13}$ and $F_{23}$, $G_{11}$ and $G_{12}$, and $G_{21}$ and $G_{22}$ of the matrices $\Phi$, $\epsilon_1$ and $\epsilon_2$, respectively, for each of the three servo control system operating modes are stored in the EEPROM 40. They are loaded into the RAM 62 of the DSP 60 by the Z8 58 as needed.

The coefficients $L_1$, $L_2$ and $L_3$ are elements of an estimator gain matrix, L, used in determining the predicted relative position, $\bar{x}_1(k+1)$, predicted velocity, $\bar{x}_2(k+1)$, and predicted bias, $\bar{x}_3(k+1)$, of the data head, based on the estimated error, $x_{est\ err}(k)$, and given as follows.

$$L = \begin{vmatrix} L_1 \\ L_2 \\ L_3 \end{vmatrix}$$

There are values associated with each of the elements $L_1$, $L_2$ and $L_3$ of the estimator gain matrix L which are different for each of the servo control system operating modes. The values of the elements $L_1$, $L_2$ and $L_3$ of the estimator gain matrix, L, for each of the three servo control system operating modes are stored in the EEPROM 40. They are loaded into the RAM 62 of the DSP 60 by the Z8 58 as needed.

Some of the values associated with each of the elements $L_1$, $L_2$ and $L_3$ of the estimator gain matrix, L, are different for different servo control system operating modes because the uncertainty in the relative position of the data head, $x_{meas}(k)$, is not the same for each servo control system operating mode. For example, because the VCM current introduces more electronic noise into the detection circuitry during seeking the uncertainty the relative position of the data head, $x_{meas}(k)$, is higher. Accordingly, the values of the estimator gain matrix, L, of the coarse seek and fine seek modes should be chosen to be about 20% and 40% of that of the track following mode, respectively, so that adjustment is made for actual error in the relative position of the data head, $x_{meas}(k)$, not in response to noise in the detection circuitry.

Comparing the matrix form of the mathematical model given in chapter 2 by Workman, $X(k+1)=\Phi X(k)+\epsilon_1 u(k-1)+\epsilon_2 u(k)$, with the equations for the relative predicted position, $\bar{x}_1(k+1)$, predicted velocity, $\bar{x}_2(k+1)$ and predicted bias, $\bar{x}_3(k+1)$, of the data head, it will be recognized that the estimator gain matrix, L, is not included in the Workman model. The elements $L_1$, $L_2$ and $L_3$ of the estimator gain matrix, L, are included in the equations for the predicted relative position, $\bar{x}_1(k+1)$, predicted velocity, $\bar{x}_2(k+1)$ and predicted bias, $\bar{x}_3(k+1)$, of the data head, and the values are chosen for the elements $L_1$, $L_2$ and $L_3$ of the estimator gain matrix, L, so that the convergence of the mean of the estimated error, $x_{est\ err}(k)$, to zero is dictated by a complex pole at 180 Hz and a real pole at 106 Hz in the coarse seek mode, a complex pole at 350 Hz and a real pole at 93 Hz in the fine seek mode and a complex pole at 930 Hz and real pole at 82 Hz in the track following mode. The pole locations determine how quickly the estimated error, $x_{est\ err}(k)$ will converge to zero. During seeking the complex poles are chosen so that the estimated error, $x_{est\ err}(k)$, will converge slowly to zero to attenuate the sensitivity to noise of the estimated error, $x_{est\ err}(k)$.

Next at step 80, the DSP 60 will determine whether the current servo control system is in either of the two seek modes or in the track following mode. If the servo control system is in the track following mode, the servo control system, at step 82, will determine whether a seek command has been received. When, at step 82, a seek command has not been received or the servo control system is otherwise in either in the coarse seek or fine seek modes, the DSP 60, at step 84, will stay in the current servo control system operating mode, if the absolute value of the predicted relative position of the data head, $|\bar{x}_1(k+1)|$, is within the range of tracks of the current servo control system operating mode. For example, if the current servo control system operating mode is coarse seek mode and the absolute value of the predicted relative position of the data head, $|\bar{x}_1(k+1)|$, is greater than 64 tracks, and the coarse seek mode of the servo control system corresponds to a range of tracks greater than 64, then the servo control system operating mode will remain unchanged from the coarse seek mode.

If the current servo control system operating mode remains unchanged, then, next at step 86, the precalculated value, $u_{pre\ cal}(k+1)$, is determined for use during the execution of the state estimator method for the next servo sector sample. When the servo control operating mode is either coarse seek or fine seek mode, a velocity trajectory, $v_{cmd}(k+1)$, for the data head is first determined. The velocity trajectory, $V_{cmd}(k+1)$, adjusts the predicted velocity of the data head, $\bar{x}_2(k+1)$, and is calculated using a cubic polynomial having the coefficients $c_1$, $c_2$, $c_3$, and $c_4$, according to the following equation:

$V_{cmd}(k+1)=c_1|\bar{x}_1(k+1)|^3+c_2|\bar{x}_1(k+1)|^2+c_3|\bar{x}_1(k+1)|+c_4$ In order to calculate the cubic polynomial coefficients $c_1$, $c_2$, $c_3$, and $c_4$, a method for determining the velocity trajectory, $v_{cmd}(k+1)$, is discussed in chapter 11 of "Digital Control of Dynamic Systems" 2nd edition by Franklin, Powell and Workman. In addition to being used to calculate the velocity trajectory, $v_{cmd}(k+1)$, the predicted relative position of the data head, $\bar{x}_1(k+1)$, will be used during the execution of the state estimator method for the next servo sector sample to calculate the estimated error, $x_{est\ err}(k)$, as explained above. The values of the cubic polynomial coefficients $c_1$, $c_2$, $c_3$, and $c_4$, for the coarse seek and fine seek modes are stored in the EEPROM 40. They are loaded into the RAM 62 of the DSP 60 by the Z8 58 as needed.

The velocity trajectory, $V_{cmd}(k+1)$, is then adjusted to take on the sign of the expression $(-\bar{x}_1(k+1))$, and combined with the predicted velocity, $\bar{x}_2(k+1)$, and the predicted bias, $\bar{x}_3(k+1)$, of the data head, to form the precalculated value, $u_{pre\ cal}(k+1)$, according to the following equation:

$$u_{pre\ cal}(k+1)=k_2(v_{cmd}(k+1)-\bar{x}_2(k+1))-k_3\bar{x}_3(k+1)$$

When the servo control system operating mode is track following mode, the precalculated value, $u_{precal}(k+1)$, is calculated as follows:

$$u_{pre\ cal}(k+1)=-k_1\bar{x}_1(k+1)-k_2\bar{x}_2(k+1)-k_3\bar{x}_3(k+1)$$

The coefficients $k_1$, $k_2$ and $k_3$ are elements of a controller gain matrix, K, which represent, respectively, position, velocity and bias feedback of the data head. The controller gain matrix, K, is given as follows.

$$K=|k_1 k_2 k_3|$$

The values of the elements $k_1$, $k_2$ and $k_3$ of the controller gain matrix, K, are selected according to the seek time requirements, as well as the open Iccp crossover frequency and its associated phase and gain margins. In the example to be given, the average seek time must be lower than 14 mS, and the open Iccp crossover frequency is approximately 430 Hz with at least 34 degrees of phase margin and 6 dB of gain margin. The values of the elements of the controller gain matrix, K, in the track following mode are not the same as the values in the coarse seek and fine seek modes due to the difference in the VCM power amplifier gain, $K_p$, between the track following mode and the coarse seek and fine seek modes. The values of the elements $k_1$, $k_2$, and $k_3$, of the controller gain matrix, K, for the servo control system operating modes are stored in the EEPROM 40. They are loaded into the RAM 62 of the DSP 60 by the Z8 58 as needed.

Next at step 88, the DSP 60 will then wait for the next servo sector sample. For all three servo control system operating modes, the servo sector sample entry point is always at step 70.

When, at step 82, the Z8 58 determines that a seek command has been received, the Z8 58, at step 90, will then determine the difference between the current track and the new target track and, at step 92, put the servo control system in the operating mode corresponding to the difference between the current track and the new target track determined at step 90, or when, at step 84, the DSP 60 determines that the servo control system is not in the correct operating mode, the Z8 58, at step 92, will put the servo control system into the operating mode corresponding to the absolute value of the predicted relative position of the data head, $|\bar{x}_1(k+1)|$.

Next at step 94, the Z8 58 rescales the predicted relative position, $\bar{x}_1(k+1)$, predicted velocity, $\bar{x}_2(k+1)$ and predicted bias, $\bar{x}_3(k+1)$, of the data head, by either multiplying or dividing the predicted relative position, $\bar{x}_1(k+1)$, predicted velocity, $\bar{x}_2(k+1)$ and predicted bias, $\bar{x}_3(k+1)$, of the data head, by a factor determined by the change in resolution of the predicted relative position, $\bar{x}_1(k+1)$, predicted velocity, $\bar{x}_2(k+1)$ and predicted bias, $\bar{x}_3(k+1)$, of the data head, as the servo control system operating mode changes. For example, when the servo control system operating mode changes from coarse seek mode to fine seek mode, the predicted relative position, $\bar{x}_1(k+1)$, of the data head, will be multiplied by 16 due to the change in the resolution of the PES from 4 bits to 8 bits. The difference is 4 bits or $2^4=16$.

The rescaling of the predicted relative position, $\bar{x}_1(k+1)$, predicted velocity, $\bar{x}_2(k+1)$ and predicted bias, $\bar{x}_3(k+1)$, of the data head, for changes between each of the three servo control system operating modes is accomplished according to the following expressions. The expression for rescaling the predicted relative position of the data head, $\bar{x}_1(k+1)$, from the coarse seek mode to the fine seek mode is:

$$16\bar{x}_1(k+1)=>\bar{x}_1(k+1)$$

The expressions for rescaling the predicted relative position, $\bar{x}_1(k+1)$, predicted velocity, $\bar{x}_2(k+1)$ and predicted bias, $\bar{x}_3(k+1)$, of the data head, from the fine seek mode to the track following mode, respectively, are:

$$8\bar{x}_1(k+1)=>\bar{x}_1(k+1)$$

$$4\bar{x}_2(k+1)=>\bar{x}_2(k+1)$$

$$4\bar{x}_3(k+1)=>\bar{x}_3(k+1)$$

The expressions for rescaling the predicted relative position, $\bar{x}_1(k+1)$, predicted velocity, $\bar{x}_2(k+1)$ and predicted bias, $\bar{x}_3(k+1)$, of the data head, from the track following mode to the coarse seek mode, respectively, are:

$$(\bar{x}_1(k+1)/128)+(x_{current\ track}-x_{new\ target})=>\bar{x}_1(k+1)$$

$$\bar{x}_2(k+1)/4=>\bar{x}_2(k+1)$$

$$\bar{x}_3(k+1)/4=>\bar{x}_3(k+1)$$

The $x_{current\ track}$ and the $x_{new\ target}$ are the current track over which the data head is flying and a new target track of the data head specified by the seek command, respectively. The expressions for rescaling the predicted relative position, $\bar{x}_1(k+1)$, predicted velocity, $\bar{x}_2(k+1)$ and predicted bias, $\bar{x}_3(k+1)$, of the data head, from the track following mode to the fine seek mode, respectively, are:

$$(\bar{x}_1(k+1)/8)+(x_{current\ track}-x_{new\ target})=>\bar{x}_1(k+1)$$

$$\bar{x}_2(k+1)/4=>\bar{x}_2(k+1)$$

$$\bar{x}_3(k+1)/4=>\bar{x}_3(k+1)$$

At step 94, the Z8 58 also reloads, from the EEPROM 40, the RAM 62 of the DSP 60 with the values of the elements $F_{12}$, $F_{13}$ and $F_{23}$, $G_{11}$ and $G_{12}$, and $G_{21}$ and $G_{22}$ of the matrices $\Phi$, $\epsilon_1$ and $\epsilon_2$, respectively, the elements $L_1$, $L_2$ and $L_3$ of the estimator gain matrix, L, the estimated error gain constant, $k_{est\ err}$, the VCM control signal gain constant, $k_{gain}$, and the elements $k_2$ and $k_3$ of the controller gain matrix, K, when the servo control system operating mode determined at step 92 is any of the three servo control system operating modes, and the element $k_1$ as well, when the servo control system operating mode determined at step 92 is the track following mode, and the cubic polynomial coefficients $c_1$, $c_2$, $c_3$, and $c_4$, as well, when the servo control system operating mode determined at step 92 is either the coarse seek mode or the fine seek mode.

Next, as shown in FIG. 5 the state estimator method proceeds to step 86, as discussed above, to calculate the precalculated value, $u_{pre\ cal}(k+1)$, for use during the next servo control system interrupt.

An example of application of the servo control system of the present invention to an actual disk drive system will now be given. The steps in the example will be referenced to the flow diagram set out in FIG. 5 and the block diagram/schematic in FIG. 4. The example will trace four separate executions of the state estimator method by the servo control system, wherein each execution of the state estimator begins with the receipt by the CPU 30 of a servo sector sample as shown at step 70 in FIG. 5.

It should be appreciated that the four servo sector samples and the corresponding executions of the state estimator method by the servo control system, are set forth to explain the change between various operating modes of the servo control system. The terms first, second, third and fourth servo sector samples and the corresponding terms first, second, third and fourth executions of the state estimator method are not meant to imply that the second servo sector sample immediately succeeds the first servo sector sample, and that the third sector sample immediately succeeds the second servo sector sample, etc. In fact, there may be many servo sector samples and corresponding executions of the state estimator method between the four servo sector samples given in the following example.

At the start of the first execution of the state estimator method, the servo control system will be in the coarse seek mode, and will stay in the coarse seek mode during the first execution of the state estimator method. At a later time, during a second execution of the state estimator method, following a second servo sector sample, the servo control system operating mode will change from coarse seek mode to fine seek mode. At a later time, during a third execution of the state estimator method, following a third servo sector sample, the servo control system operating mode will change from fine seek mode to track following mode. Finally, at a later time, during a fourth execution of the state estimator method, following a fourth servo sector sample, the servo control system operating mode will change from track following mode to coarse seek mode.

In the following example, the values of the state estimator method constants, are, as calculated, in a floating point numerical format which is not useable by the DSP 60. Accordingly, the values of each of the state estimator method constants, are converted into integer numbers. In converting the floating point numbers of the state estimator constants into integers, the relationships of the state estimator method constants to one another are maintained by taking into account the full scale valuea of the other terms in the equations in which each of the state estimator method constants are used.

To convert from the floating point value to the integer value of each state estimator method constant, a ratio is first determined comprising the ratio of the full scale (FS) value of the quantity for which the state estimator method constant is a coefficient to the full scale value of the quantity for which the state estimator method constant is being used to calculate. For example, when the state estimator constant to be converted from a floating point value to an integer value is the element $F_{12}$ in the following equation, $$\bar{x}_1(k+)=\bar{x}_1(k)+F_{12}\bar{x}_2(k)+F_{13}\bar{x}_3(k)+L_1 x_{est\ err}(k)+G_{11}u(k-1)+G_{21}u(k)$$

the ratio comprises the ratio of the full scale value of $\bar{x}_2$ to the full scale value of $\bar{x}_1$ (i.e. FS $\bar{x}_2(k)$/FS $\bar{x}_1(k)$). The ratio is then multiplied by the floating point value of the state estimator method constant. This quantity is then multiplied by the resolution available in the DSP 60, which is $2^{15}$. The integer value of the state estimator method constant being calculated is then checked to make sure it is not larger than the largest available number (32767) in the DSP 60. When the integer value is larger than 32767, the integer value is divided by an amount chosen to keep the integer value in an acceptable range. The DSP 60 then compensates for this division when the integer value of the state estimator method constant is used by the DSP 60.

Both the floating point and integer values of each of the state estimator method constants will be given in the following example, as well as the equations used to convert each of the floating point values to integer values. The full scale values used in the equations for each of the servo control system operating modes are as follows.

In the coarse seek mode, the full scale value of the predicted relative position, $x_1$, is $2^{22}$, the full scale value of the predicted velocity, $\bar{x}_2$, is $2^{16}$, the full scale value of the predicted bias, $\bar{x}_3$, is $2^{12}$ and the full scale value of the digital VCM control signal, u, is $2^{15}$.

In the fine seek mode, the full scale value of the predicted relative position, $\bar{x}_1$, is $2^{18}$, the full scale value of the predicted velocity, $\bar{x}_2$, is $2^{16}$, the full scale value of the predicted bias, $\bar{x}_3$, is $2^{12}$ and the full scale value of the digital VCM control signal, u, is $2^{15}$.

In the track following mode, the full scale value of the predicted relative position, $\bar{x}_1$, is $2^{15}$, the full scale value of the predicted velocity, $\bar{x}_2$, is $2^{14}$, the full scale value of the predicted bias, $\bar{x}_3$, is 3124 and the full scale value of the digital VCM control signal, u, is $2^{15}$.

First, at step 70, a first servo sector sample is received by the CPU 30, and a first execution of the state estimator method begins. Next at step 72, the DSP 60 forms a relative position of the data head, $x_{meas}(k)$, by subtracting the current track number from the target track number and then combining this difference with the PES. Since the servo control system is in the coarse seek mode the relative position of the data head, $x_{meas}(k)$, will be formed according to the following bit allocation.

| bit | S 0 | T 1 | T 2 | T 3 | T 4 | T 5 | T 6 | T 7 | T 8 | T 9 | T 10 | T 11 | P 12 | P 13 | P 14 | P 15 |
|---|---|---|---|---|---|---|---|---|---|---|---|---|---|---|---|---|

Next at step 74, the DSP 60 calculates an estimated error, $x_{est\ err}(k)$, according to the following equation.

$$x_{est\ err}(k)=x_{meas}(k)-\bar{x}_1(k)$$

Next at step 76, the estimated error, $x_{est\ err}(k)$, is multiplied by an estimated error gain constant, $k_{est\ err}$, and subtracted from a precalculated value, $u_{pre\ cal}(k)$, to form a digital VCM control signal, u(k). The precalculated value, $u_{pre\ cal}(k)$, was calculated, during the execution of the state estimator method for a previous servo sector sample. The digital VCM control signal, u(k), is calculated according to the following equation.

$$u(k)=u_{pre\ cal}(k)-k_{est\ err}(k)$$

In the coarse seek mode, the floating point and integer values of the estimated error gain constant, $k_{est\ err}$, are 0.0933 and 6113, respectively. The integer value of the estimated error gain constant, $k_{est\ err}$, is calculated according to the following equation.

$$k_{est\ err}(integer)=(FS\bar{x}_1/FS\ u)(2^{15}/2^6)(k_{est\ err}(floating\ point))$$

The digital VCM control signal, u(k), is then multiplied by a VCM control signal gain constant, $k_{gain}$, which is chosen to perform a right shift of 4 bits in the digital VCM control signal, u(k), to form a normalized digital VCM control signal $u_{dec}(k)$, which is calculated according to the following equation:

$$u_{dac}(k)=k_{gain}u(k)$$

In the coarse seek mode, the floating point and integer values of $k_{gain}$ are 0.0625 and 4096, respectively. The multiplication by the integer value of 4096 performs a right shift of 4 bits.

The DSP 60 then limits the normalized digital VCM control signal, $u_{dac}(k)$, to be within the resolution of the full swing output voltage (2 volts) available from the D/A before conveying the normalized digital VCM control signal, $u_{dac}(k)$, to the D/A 46. The D/A 46 converts the normalized digital VCM control signal $u_{dac}(k)$ to an analog VCM control signal. The VCM driver in the spindle and VCM driver module 44 then supplies current to the VCM 50 based on the analog VCM control signal. Next at step 78, the predicted relative position, $\bar{x}_1(k+1)$, predicted velocity, $\bar{x}_2(k+1)$ and predicted bias, $\bar{x}_3(k+1)$, of the data head, at the time of the next servo sector sample are calculated by the DSP 60 using the following equations.

$$\bar{x}_1(k+1)=\bar{x}_1(k)+F_{12}\bar{x}_2(k)+F_{13}\bar{x}_3(k)+L_1 x_{est\ err}(k)+G_{11}u(k-1)+G_{21}u(k)$$

$$\bar{x}_2(k+1)=\bar{x}_2(k)+F_{23}\bar{x}_3(k)+L_2 x_{est\ err}(k)+G_{12}u(k-1)+G_{22}u(k)$$

$$\bar{x}_3(k+1)=\bar{x}_3(k)+L_3 x_{est\ err}(k)$$

In the coarse seek mode, the floating point and integer values of the elements $F_{12}$, $F_{13}$ and $F_{23}$, $G_{11}$ and $G_{12}$, $G_{21}$ and $G_{22}$, and $L_1$, $L_2$ and $L_3$ of the matrices $\Phi$, $\epsilon_1$, $\epsilon_2$, and the estimator gain matrix, L, are given, respectively, as follows.

$F_{12}=1$; 512

$F_{13}=0.5959$; 19

$F_{23}=1.1818$; 2420

$G_{11}=0.2261$; 58

$G_{12}=0.2532$; 4149

$G_{21}=0.3648$; 93

$G_{22}=0.9286$; 15213

$L_1=0.63$; 323

$L_2=0.1761$; 5770

$L_3=0.0131$; 6874

The integer values of the elements $F_{12}$, $F_{13}$ and $F_{23}$ for the full scale (FS) values in the coarse seek mode are calculated according to the following equations.

$$F_{12}(integer)=(FS\bar{x}_2/FS\bar{x}_1)(2^{15})(F_{12}(floating\ point))$$

$$F_{13}(integer)=(FS\bar{x}_3/FS\bar{x}_1)(2^{15})(F_{13}(floating\ point))$$

$$F_{23}(integer)=(FS\bar{x}_3/FS\bar{x}_2)(2^{15})(F_{23}(floating\ point))$$

The integer values of the elements $G_{11}$, $G_{12}$, $G_{21}$ and $G_{22}$ for the full scale (FS) values in the coarse seek mode are calculated according to the following equations.

$$G_{11}(integer)=(FS\ u/FS\bar{x}_1)(2^{15})(G_{11}(floating\ point))$$

$$G_{21}(integer)=(FS\ u/FS\bar{x}_1)(2^{15})(G_{21}(floating\ point))$$

$$G_{12}(integer)=(FS\ u/FS\bar{x}_2)(2^{15})(G_{12}(floating\ point))$$

$$G_{22}(integer)=(FS\ u/FS\bar{x}_2)(2^{15})(G_{22}(floating\ point))$$

The integer values of the elements $L_1$, $L_2$ and $L_3$ for the full scale (FS) values in the coarse seek mode are calculated according to the following equations.

$$L_1(integer)=(FS\bar{x}_1/FS\bar{x}_1)(2^{15}/2^6)(L_1(floating\ point))$$

$$L_2(integer)=(FS\bar{x}_1/FS\bar{x}_2)(2^{15}/2^6)(L_2(floating\ point))$$

$$L_3(integer)=(FS\bar{x}_1/FS\bar{x}_3)(2^{15}/2^6)(L_3(floating\ point))$$

Next at step 80, the DSP 60 will determine whether the current servo control system operating mode is in either of the two seek modes or in track following mode. Since the current servo control system operating mode is coarse seek, the DSP 60, at step 84, will stay in the current servo system control operating mode, if the absolute value of the predicted relative position of the data head, $|\bar{x}_1(k+1)|$ determined in step 78, is within the range of tracks for the coarse seek mode. During the first execution of the state estimator method, the DSP 60 determines that the data head is still more than 64 tracks from the target track, and accordingly, the servo control system will stay in coarse seek mode.

Since the servo control system operating mode stays the same, the next step is step 86, at which the precalculated value, $u_{pre\ cal}(k+1)$, is determined for the next servo sector sample. Accordingly, the velocity trajectory $v_{cmd}(k+1)$, is first determined. The velocity trajectory, $V_{cmd}(k+1)$, is calculated using a cubic polynomial having the coefficients $c_1$, $c_2$, $c_3$, and $c_4$, according to the following equation:

$$v_{cmd}(k+1)=c_1|\bar{x}_1(k+1)|^3+c_2|\bar{x}_1(k+1)|^2+c_3|\bar{x}_1(k+1)|+c_4$$

In the coarse seek mode, the floating point and integer values of the cubic polynomial coefficients $c_1$, $c_2$, $c_3$, and $c_4$, are given, respectively, as follows.

$c_1=3.9244E-14$; 22624

$c_2=-8.197-8$; $-11267$ $c_3=0.0906$; 23753

$c_4=5.306E3$; 2653

The integer values of the coefficients $c_1$, $c_2$ and $c_3$ for the full scale (FS) values in the coarse seek mode are calculated according to the following equations.

$$c_1(integer)=((FS\bar{x}_1)^3/FS\bar{x}_2)(2^{15}/2^6)(c_1(floating\ point))$$

$$c_2(integer)=((FS\bar{x}_1)^2/FS\bar{x}_2)(2^{15}/2^6)(c_2(floating\ point))$$

$$c_3(integer)=(FS\bar{x}_1/FS\bar{x}_2)(2^{15}/2^3)(c_3(floating\ point))$$

$$c_4(integer)=(1/FS\bar{x}_2)(2^{15})(c_4(floating\ point))$$

The velocity trajectory, $v_{cmd}(k+1)$, is then adjusted to take on the sign of the expression $(-\bar{x}_1(k+1))$, and combined with the predicted velocity, $\bar{x}_2(k+1)$, and the predicted bias, $\bar{x}_3(k+1)$, of the data head, to form the precalculated value, $u_{precal}(k+1)$. In the coarse seek mode the precalculated value, $u_{precal}(k+1)$, is calculated as follows:

$$u_{pre\ cal}(k+1)=k_2(v_{cmd}(k+1)-\bar{x}_2(k+1))-k_3\bar{x}_3(k+1)$$

In the coarse seek mode, the floating point and integer values of the elements $k_2$ and $k_3$ of the estimator gain matrix, K, are given, respectively, as follows.

$k_2=0.4992$; 32714

$k_3=1$; 4096

The integer values of the elements $k_2$ and $k_3$ for the full scale (FS) values in the coarse seek mode are calculated according to the following equations.

$$k_2(integer)=(FS\bar{x}_2/FS\ u)(2^{15})(k_2(floating\ point))$$

$$k_3(integer)=(FS\bar{x}_3/FS\ u)(2^{15})(k_3(floating\ point))$$

The values for the predicted velocity, $\bar{x}_2(k+1)$, and predicted bias, $\bar{x}_3(k+1)$, of the data head, respectively were calculated at step 78.

Next at step 88, the servo control system waits for a second servo sector sample.

Next, a second execution of the state estimator method begins with the receipt, at step 70, of a second servo sector sample. Since the servo control system is in the coarse seek mode, the execution of steps 72–78 will not be discussed, as they are the same as steps 72–78 executed during the first execution of the state estimator method. It should be noted, however, that the values for the predicted relative position of the data head, $x_1(k)$, and the precalculated value, $u_{pre\ cal}(k)$, used in the second execution of the state estimator method, were those calculated during the immediately preceding execution of the state estimator method.

Accordingly, next, at step 80, the DSP 60 will determine whether the current servo control operating mode is in either of the two seek modes or in track following mode. Since the current servo operating mode of the servo control system is coarse seek mode, the DSP 60, at step 84, will stay in the current servo system control operating mode, if the absolute value of the predicted relative position of the data head, $|x_1(k+1)|$, is within the range of tracks of the coarse seek mode. At this point, the DSP 60 determines that the data head is less than 64 tracks from the target track and greater than ½ track from the target track. Accordingly, at step 92, the servo control system switches to the fine seek mode.

Since the servo control system operating mode has changed, at step 94, the Z8 will rescale the predicted relative position of the data head from the coarse seek mode to the fine seek mode according to the following expression:

$$16x_1(k+1) \Rightarrow x_1(k+1)$$

At step 94, the Z8 58 will also reload from EEPROM 40 the RAM 62 of the DSP with the values of the elements $F_{12}$, $F_{13}$ and $F_{23}$, $G_{11}$ and $G_{12}$, and $G_{21}$ and $G_{22}$ of the matrices $\Phi$, $\epsilon_1$ and $\epsilon_2$, respectively, the elements $L_1$, $L_2$ and $L_3$ of the estimator gain matrix, L, the estimated error gain constant, $k_{est\ err}$, the VCM control signal gain constant, $k_{gain}$, the elements $k_2$ and $k_3$ of the controller gain matrix, K, and the cubic polynomial coefficients $c_1$, $c_2$, $c_3$, and $c_4$, for the fine seek mode determined at step 92. These floating point and integer values, respectively, in the fine seek mode are given as follows.

$F_{12}$=1; 8192
$F_{13}$=0.5959; 303
$F_{23}$=1.1818; 2420
$G_{11}$=0.2261; 926
$G_{12}$=0.2532; 4149
$G_{22}$=0.3648; 1494
$G_{22}$=0.9286; 15213
$L_1$=0.983; 4026
$L_2$=0.3522; 5770
$L_3$=0.0262; 6874
$k_{est\ err}$=0.1866; 6133
$k_{gain}$=0.0625, 4096
$c_1$=2.2355E-12; 315
$c_2$=-9.2531E-7; -497
$c_3$=2.029E-1; 3324
$c_4$=1.4293E2; 71
$k_2$=0.4992; 32714
$k_3$=1; 4096

The integer values of the elements $F_{12}$, $F_{13}$ and $F_{23}$ for the full scale (FS) values in the fine seek mode are calculated according to the following equations.

$F_{12}$(integer)=(FS$\bar{x}_2$/FS$\bar{x}_1$)($2^{15}$)($F_{12}$(floating point))

$F_{13}$(integer)=(FS$\bar{x}_3$/FS$\bar{x}_1$)($2^{15}$)($F_{13}$(floating point))

$F_{23}$(integer)=(FS$\bar{x}_3$/FS$\bar{x}_2$)($2^{15}$)($F_{23}$(floating point))

The integer values of the elements $G_{11}$, $G_{12}$, $G_{21}$ and $G_{22}$ for the full scale (FS) values in the fine seek mode are calculated according to the following equations.

$G_{11}$(integer)=(FS u/FS$\bar{x}_1$)($2^{15}$)($G_{11}$(floating point))

$G_{21}$(integer)=(FS u/FS$\bar{x}_1$)($2^{15}$)($G_{21}$(floating point))

$G_{12}$(integer)=(FS u/FS$\bar{x}_2$)($2^{15}$)($G_{12}$(floating point))

$G_{22}$(integer)=(FS u/FS$\bar{x}_2$)($2^{15}$)($G_{22}$(floating point))

The integer values of the elements $L_1$, $L_2$ and $L_3$ for the full scale (FS) values in the fine seek mode are calculated according to the following equations.

$L_1$(integer)=(FS$\bar{x}_1$/FS$\bar{x}_1$)($2^{15}/2^3$)($L_1$(floating point))

$L_2$(integer)=(FS$\bar{x}_1$/FS$\bar{x}_2$)($2^{15}/2^3$)($L_2$(floating point))

$L_3$(integer)=(FS$\bar{x}_1$/FS$\bar{x}_3$)($2^{15}/2^3$)($L_3$(floating point))

The integer value of the estimated error gain constant, $k_{est\ err}$, in the fine seek mode is calculated according to the following equation.

$k_{est\ err}$(integer)=(FS$\bar{x}_1$/FS u)($2^{15}/2^3$)($k_{est\ err}$(floating point)) In the fine seek mode, the multiplication by the integer value of $k_{gain}$ of 4096 performs a right shift of 4 bits.

The integer values of the coefficients $c_1$, $c_2$ and $c_3$ for the full scale (FS) values in the fine seek mode are calculated according to the following equations.

$c_1$(integer)=((FS$\bar{x}_1$)$^3$/FS$\bar{x}_2$)($2^{15}/2^6$)($c_1$(floating point))

$c_2$(integer)=((FS$\bar{x}_1$)$^2$/FS$\bar{x}_2$)($2^{15}/2^6$)($c_2$(floating point))

$c_3$(integer)=(FS$\bar{x}_2$/FS$\bar{x}_2$)($2^{15}/2^3$)($c_3$(floating point))

$c_4$(integer)=(1/FS$\bar{x}_2$)($2^{15}$)($c_4$(floating point))

The integer values of the elements $k_2$ and $k_3$ for the full scale (FS) values in the fine seek mode are calculated according to the following equations.

$k_2$(integer)=(FS$\bar{x}_2$/FS u)($2^{15}$)($k_2$(floating point))

$k_3$(integer)=(FS$\bar{x}_3$/FS u)($2^{15}$)($k_3$(floating point))

Next, as shown in FIG. 5 the servo control method proceeds to step 86 to calculate the precalculated value, $u_{pre\ cal}(k+1)$. Since the servo control system is in the fine seek mode, the velocity trajectory, $v_{cmd}(k+1)$, is calculated according to the following equation:

$$v_{cmd}(k+1)=c_1|\bar{x}_1(k+1)|^3+c_2|\bar{x}_1(k+1)|^2+c_3|\bar{x}_1(k+1)|+c_4$$

The values of the cubic polynomial coefficients $c_1$, $c_2$, $c_3$, and $c_4$, and the value of the predicted relative data head position, $x_1(k+1)$, which are used, are, respectively, those loaded into the RAM 62 of the DSP 60 and the rescaled value from the most recent step 94.

The velocity trajectory, $v_{cmd}(k+1)$, is then adjusted to take on the sign of the expression $(-\bar{x}_1(k+1))$, and combined with the predicted velocity, $\bar{x}_2(k+1)$, and the predicted bias, $\bar{x}_3(k+1)$, of the data head, to form the precalculated value, $u_{pre\ cal}(k+1)$. In the fine seek mode, the precalculated value, $u_{pre\ cal}(k+1)$, is calculated as follows:

$$u_{pre\ cal}(k+1)=k_2(v_{cmd}(k+1)-\bar{x}_2(k+1))-k_3\bar{x}_3(k+1)$$

The values of the elements $k_2$ and $k_3$ of the estimator gain matrix, K, which are used, are those loaded into the RAM 62 of the DSP 60 in the most recent step 94. Next at step 88, the servo control system waits for a third servo sector sample.

At step 70, a third servo sector sample is received and a third execution of the state estimator method begins. Next at step 72, the DSP 60 forms a relative position of the data head, $x_{meas}(k)$, by subtracting the current track number from the target track number and then combining this difference with the PES. Since the servo control system is in the fine seek mode the relative position of the data head, $x_{meas}(k)$, will be formed according to the following bit allocation.

| bit | S<br>0 | T<br>1 | T<br>2 | T<br>3 | T<br>4 | T<br>5 | T<br>6 | T<br>7 | P<br>8 | P<br>9 | P<br>10 | P<br>11 | P<br>12 | P<br>13 | P<br>14 | P<br>15 |
|---|---|---|---|---|---|---|---|---|---|---|---|---|---|---|---|---|

Next at step 74, the DSP 60 calculates an estimated error, $x_{est\ err}(k)$, according to the following equation.

$$x_{est\ err}(k) = x_{meas}(k) - \bar{x}_1(k)$$

Next at step 76, the estimated error, $X_{est\ err}(k)$, is multiplied by an estimated error gain constant, $k_{est\ err}$, and subtracted from a precalculated value, $u_{pre\ cal}(k)$, to form a digital VCM control signal, $u(k)$. The precalculated value, $u_{pre\ cal}(k)$, was calculated, during the execution of the state estimator method for a previous servo sector sample. The digital VCM control signal, $u(k)$, is calculated according to the following equation.

$$u(k) = u_{pre\ cal}(k) - k_{est\ err} x_{est\ err}(k)$$

In the fine seek mode, the floating point and integer values of the estimated error gain constant $k_{est\ err}$, are 0.1866 and 6113, respectively.

The digital VCM control signal, $u(k)$, is then multiplied by a VCM control signal gain constant, $k_{gain}$, which is chosen to perform a right shift of 4 bits in the digital VCM control signal, $u(k)$, to form a normalized digital VCM control signal, $u_{dac}(k)$, which is calculated according to the following equation:

$$u_{dac}(k) = k_{gain} u(k)$$

In the fine seek mode, the floating point and integer values of $k_{gain}$ are 0.0625 and 4096, respectively.

The DSP 60 then limits the normalized digital VCM control signal, $u_{dac}(k)$, to be within the resolution of the full swing output voltage (2 volts) available from the D/A before conveying the normalized digital VCM control signal, $u_{dac}(k)$, to the D/A 46. The D/A 46 converts the normalized digital VCM control signal, $u_{dac}(k)$, to an analog VCM control signal. The VCM driver in the spindle and VCM driver module 44 then supplies current to the VCM 50 based on the analog VCM control signal.

Next at step 78, the predicted relative position, $\bar{x}_1(k+1)$, predicted velocity, $\bar{x}_2(k+1)$ and predicted bias, $\bar{x}_3(k+1)$, of the data head, at the time of the next servo sector sample are calculated by the DSP 60 using the following equations.

$$\bar{x}_1(k+1) = \bar{x}_1(k) + F_{12}\bar{x}_2(k) + F_{13}\bar{x}_3(k) + i\ L_1 x_{est\ err}(k) + G_{11} u(k-1) + G_{21} u(k)$$

$$\bar{x}_2(k+1) = \bar{x}_2(k) + F_{23}\bar{x}_3(k) + L_2 x_{est\ err}(k) + G_{12} u(k-1) + G_{22} u(k)$$

$$\bar{x}_3(k+1) = \bar{x}_3(k) + L_3 x_{est\ err}(k)$$

In the fine seek mode, the floating point and integer values of the elements $F_{12}$, $F_{13}$ and $F_{23}$, $G_{11}$ and $G_{12}$, $G_{21}$ and $G_{22}$, and $L_1$, $L_2$ and $L_3$ of the matrices $\Phi$, $\epsilon_1$, $\epsilon_2$, and the estimator gain matrix, L, respectively, are given as follows.

$F_{12}=1$; 8192

$F_{13}=0.5959$; 303

$F_{23}=1.1818$; 2420

$G_{11}=0.2261$; 926

$G_{12}=0.2532$; 4149

$G_{21}=0.3648$; 1494

$G_{22}=0.9286$; 15213

$L_1=0.983$; 4026

$L_2=0.3522$; 5770

$L_3=0.0262$; 6874

Accordingly, next, at step 80, the DSP 60 will determine whether the current servo control operating mode is in either of the two seek modes or in track following mode. Since the current servo operating mode of the servo control system is fine seek mode, the DSP 60 at step 84 will stay in the current servo system control operating mode, if the absolute value of the predicted relative position of the data head, $|\bar{x}_1(k+1)|$, is within the range of tracks of the fine seek mode. At this point, the DSP 60 determines that the data head is less than ½ track from the target track. Accordingly, at step 92, the servo control system switches to the track following operating mode.

Since the servo control system operating mode has changed, at step 94, the Z8 will rescale the predicted relative position, $\bar{x}_1(k+1)$, predicted velocity, $\bar{x}_2(k+1)$ and predicted bias, $\bar{x}_3(k+1)$, of the data head, from the fine seek mode to the track following mode according to the following expressions:

$$8\bar{x}_1(k+1) \Rightarrow \bar{x}_1(k+1)$$

$$4\bar{x}_2(k+1) \Rightarrow \bar{x}_2(k+1)$$

$$4\bar{x}_3(k+1) \Rightarrow \bar{x}_3(k+1)$$

At step 94, the Z8 58 will also reload from EEPROM 40 the RAM 62 of the DSP with the values of the elements $F_{12}$, $F_{13}$ and $F_{23}$, $G_{11}$ and $G_{12}$, and $G_{21}$ and $G_{22}$ of the matrices $\Phi$, $\epsilon_1$ and $\epsilon_2$, respectively, the elements $L_1$, $L_2$ and $L_3$ of the estimator gain matrix, L, the estimated error gain constant, $k_{est\ err}$, the VCM control signal gain constant, $k_{gain}$, and the elements $k_1$, $k_2$, $k_3$ of the controller gain matrix K for the track following mode determined at step 92. These floating point and integer values, respectively, in the track following mode are given as follows.

$F_{12}=1$; 16384

$F_{13}=0.1937$; 605

$F_{23}=0.3873$; 2420

$G_{11}=0.0741$; 2428

$G_{12}=0.083$; 5440

$G_{21}=0.1196$; 3918

$G_{22}=0.3043$; 19945

$L_1=1.765$; 7229

$L_2=0.8805$; 7213

$L_3=0.2$; 6874

$k_{est\ err}=1.7132$; 7017

$k_{gain}=0.0625$; 4096

$k_1=0.3143$; 10298

$k_2=1.523; 24953$ $k_3=1; 3124$

The integer values of the elements $F_{12}$, $F_{13}$ and $F_{23}$ for the full scale (FS) values in the track following mode are calculated according to the following equations.

$$F_{12}(\text{integer})=(FS\bar{x}_2/FS\bar{x}_1)(2^{15})(F_{12}(\text{floating point}))$$

$$F_{13}(\text{integer})=(FS\bar{x}_3/FS\bar{x}_1)(2^{15})(F_{13}(\text{floating point}))$$

$$F_{23}(\text{integer})=(FS\bar{x}_3/FS\bar{x}_2)(2^{15})(F_{23}(\text{floating point}))$$

The integer values of the elements $G_{11}$, $G_{12}$, $G_{21}$ and $G_{22}$ for the full scale (FS) values in the track following mode are calculated according to the following equations.

$$G_{11}(\text{integer})=(FS\ u/FS\bar{x}_1)(2^{15})(G_{11}(\text{floating point}))$$

$$G_{21}(\text{integer})=(FS\ u/FS\bar{x}_1)(2^{15})(G_{21}(\text{floating point}))$$

$$G_{12}(\text{integer})=(FS\ u/FS\bar{x}_2)(2^{15})(G_{12}(\text{floating point}))$$

$$G_{22}(\text{integer})=(FS\ u/FS\bar{x}_2)(2^{15})(G_{22}(\text{floating point}))$$

The integer values of the elements $L_1$, $L_2$ and $L_3$ for the full scale (FS) values in the track following mode are calculated according to the following equations.

$$L_1(\text{integer})=(FS\bar{x}_1/FS\bar{x}_1)(2^{15}/2^3)(L_1(\text{floating point}))$$

$$L_2(\text{integer})=(FS\bar{x}_1/FS\bar{x}_2)(2^{15}/2^3)(L_2(\text{floating point}))$$

$$L_3(\text{integer})=(FS\bar{x}_1/FS\bar{x}_3)(2^{15}/2^3)(L_3(\text{floating point}))$$

The integer value of the estimated error gain constant, $k_{est\ err}$, in the track following mode is calculated according to the following equation.

$$k_{est\ err}(\text{integer})=(FS\bar{x}_1/FS\ u)(2^{15}/2^3)(k_{est\ err}(\text{floating point}))$$

In the track following mode, the multiplication by the integer value of $k_{gain}$ of 4096 performs a right shift of 4 bits.

The integer values of the elements $k_1$, $k_2$, and $k_3$ for the full scale (FS) values in the track following mode are calculated according to the following equations.

$$k_1(\text{integer})=(FS\bar{x}_1/FS\ u)(2^{15}/2^4)(k_1(\text{floating point}))$$

$$k_2(\text{integer})=(FS\bar{x}_2/FS\ u)(2^{15})(k_2(\text{floating point}))$$

$$k_3(\text{integer})=(FS\bar{x}_3/FS\ u)(2^{15})(k_3(\text{floating point}))$$

Next, as shown in FIG. 5 the servo control method proceeds to step 86 to calculate the precalculated value, $u_{pre\ cal}(k+1)$. Since the servo control system is in the track following operating mode, the control signal, $u_{pre\ cal}(k+1)$, is simply calculated as follows:

$$u_{pre\ cal}(k+1)=-k_1\bar{x}_1(k+1)-k_2\bar{x}_2(k+1)-k_3\bar{x}_3(k+1)$$

The values of the elements $k_1$, $k_2$ and $k_3$ of the estimator gain matrix, K, which are used, are those loaded into the RAM 62 of the DSP 60 in the most recent step 94. Next at step 88, the servo control system waits for a servo sector sample.

At step 70, a fourth servo sector sample is received and a fourth execution of the state estimator method begins. Next at step 72, the DSP 60 forms a relative position of the data head, $x_{meas}(k)$, by subtracting the current track number from the target track number and then combining this difference with the PES. Since the servo control system is in the track following mode the relative position of the data head, $x_{meas}(k)$, will be formed according to the following bit allocation.

| | S | T | T | T | T | P | P | P | P | P | P | P | P | P | P | P |
|---|---|---|---|---|---|---|---|---|---|---|---|---|---|---|---|---|
| bit | 0 | 1 | 2 | 3 | 4 | 5 | 6 | 7 | 8 | 9 | 10 | 11 | 12 | 13 | 14 | 15 |

Next at step 74, the DSP 60 calculates an estimated error, $x_{est\ err}(k)$, according to the following equation.

$$x_{est\ err}(k)=x_{meas}(k)-\bar{x}_1(k)$$

Next at step 76, the estimated error, $x_{est\ err}(k)$, is multiplied by an estimated error gain constant, $k_{est\ err}$, and subtracted from a precalculated value, $u_{pre\ cal}(k)$, to form a digital VCM control signal, $u(k)$. The precalculated value, $u_{pre\ cal}(k)$, was calculated, during the execution of the state estimator method for a previous servo sector sample. The digital VCM control signal, $u(k)$, is calculated according to the following equation.

$$u(k)=u_{pre\ cal}(k)-k_{est\ err}x_{est\ err}(k)$$

In the track following mode, the floating point and integer values of the estimated error gain constant, $k_{est\ err}$, are 1.7132 and 7017, respectively.

The digital VCM control signal, $u(k)$, is then multiplied by a VCM control signal gain constant, $k_{gain}$, which is chosen to perform a right shift of 4 bits in the digital VCM control signal, $u(k)$, to form a normalized digital VCM control signal, $u_{dac}(k)$, which is calculated according to the following equation:

$$u_{dac}(k)=k_{gain}u(k)$$

In the track following mode, the floating point and integer values of the VCM control signal gain constant, $k_{gain}$, are 0.0625 and 4096, respectively.

The DSP 60 then limits the normalized digital VCM control signal, $u_{dac}(k)$, to be within the resolution of the full swing output voltage (2 volts) available from the D/A 46 before conveying the normalized digital VCM control signal, $u_{dac}(k)$, to the D/A 46. The D/A 46 converts the normalized digital VCM control signal, $u_{dac}(k)$, to an analog VCM control signal. The VCM driver in the spindle and VCM driver module 44 then supplies current to the VCM 50 based on the analog VCM control signal. Next at step 78, the predicted relative position, $\bar{x}_1(k+1)$, predicted velocity, $\bar{x}_2(k+1)$ and predicted bias, $\bar{x}_3(k+1)$, of the data head, at the time of the next servo sector sample are calculated by the DSP 60 using the following equations.

$$\bar{x}_1(k+1)=\bar{x}_1(k)+F_{12}\bar{x}_2(k)+F_{13}\bar{x}_3(k)+L_1x_{est\ err}(k)+G_{11}u(-1)+G_{21}u(k)$$

$$\bar{x}_2(k+1)=\bar{x}_2(k)+F_{23}\bar{x}_3(k)+L_2x_{est\ err}(k)+G_{12}u(k-1)+G_{22}u(k)$$

$$\bar{x}_3(k+1)=x\bar{x}_3(k)+L_3x_{est\ err}(k)$$

In the track following mode, the floating point and integer values of the elements $F_{12}$, $F_{13}$ and $F_{23}$, $G_{11}$ and $G_{12}$, $G_{21}$ and $G_{22}$, and $L_1$, $L_2$ and $L_3$ of the matrices $\Phi$, $\epsilon_1$, $\epsilon_2$, and the estimator gain matrix, L, are given, respectively, as follows.

$F_{12}=1; 16384$ $F_{13}$=0.1937; 605
$F_{23}$=0.3873; 2420
$G_{11}$=0.0741; 2428
$G_{12}$=0.083; 5440
$G_{21}$=0.1196; 3918
$G_{22}$=0.3043; 19945
$L_1$=1.765; 7229
$L_2$=0.8805; 7213
$L_3$=0.2; 6874

Accordingly, next, at step 80, the DSP 60 will determine whether the current servo control operating mode is in either of the two seek modes or in track following mode. Since the current servo operating mode of the servo control system is the track following mode, the DSP 60 at step 82 will first determine whether a seek command has been received. If a seek command has been received, the state estimator method proceed to step 90. Otherwise, the state estimator method will stay in the current servo system control operating mode, if the absolute value of the predicted relative position of the data head, $|\bar{x}_1(k+1)|$, is within the range of tracks of the track following mode. At this point, the DSP 60 determines that a seek command has been received. Accordingly, at step 90, the number of tracks between the current position of the data head and the target track of the data head is determined. For the purposes of this example, this number of tracks is determined to be greater than 64 and, at step 92, the servo control system switches to the coarse seek mode.

Since the servo control system operating mode has changed, at step 94, the Z8 will rescale the predicted relative position, $\bar{x}_1(k+1)$, predicted velocity, $\bar{x}_2(k+1)$ and predicted bias, $\bar{x}_3(k+1)$, of the data head, from the track following mode to the coarse seek mode according to the following expressions:

$$(\bar{x}_1(k+1)/128)+(x_{current\ track}-x_{new\ target})=>\bar{x}_1(k+1)$$

$$\bar{x}_2(k+1)/4=>\bar{x}_2(k+1)$$

$$\bar{x}_3(k+1)/4=>\bar{x}_3(k+1)$$

The $x_{current\ track}$ and the $x_{new\ target}$ are the current track over which the data head is flying and the new target track of the data head specified by the seek, respectively.

At step 94, the Z8 58 will also reload from EEPROM 40 the RAM 62 of the DSP with the values of the elements $F_{12}$, $F_{13}$ and $F_{23}$, $G_{11}$ and $G_{12}$, and $G_{21}$ and $G_{22}$ of the matrices $\Phi$, $\epsilon_1$ and $\epsilon_2$, respectively, the elements $L_1$, $L_2$ and $L_3$ of the estimator gain matrix, L, the estimated error gain constant $k_{est\ err}$, the VCM control signal gain constant, $k_{gain}$, the elements $k_2$ and $k_3$ of the controller gain matrix, K, and the cubic polynomial coefficients $c_1$, $c_2$, $c_3$, and $c_4$ for the coarse seek mode determined at step 92. These floating point and integer values, respectively, in the coarse seek mode are given as follows.

$F_{12}$=1; 512
$F_{13}$=0.5959; 19
$F_{23}$=1.1818; 2420
$G_{11}$=0.2261; 58
$G_{12}$=0.2532; 4149
$G_{21}$=0.3648; 93
$G_{22}$=0.9286; 15213
$L_1$=0.63; 323
$L_2$=0.1761; 5770
$L_3$=0.0131; 6874
$k_{est\ err}$=0.0933; 6113
$k_{gain}$=0.0625, 4096
$c_1$=3.9244E-14; 22624
$c_2$=-8.197-8; -11267
$c_3$=0.0906; 23753
$c_4$=5.306E3; 2653
$k_2$=0.4992; 32714
$k_3$=1; 4096

Next, as shown in FIG. 5 the servo control method proceeds to step 86 to calculate the precalculated value, $u_{pre\ cal}(k+1)$. Since the servo control system is in the coarse seek operating mode, the velocity trajectory $v_{cmd}(k+1)$ for the data head is calculated according to the following equation:

$$v_{cmd}(k+1)=c_1|\bar{x}_1(k+1)|^3+c_2|\bar{x}_1(k+1)|^2+c_3|\bar{x}_1(k+1)|+c_4$$

The values of the cubic polynomial coefficients $c_1$, $c_2$, $c_3$, and $c_4$, and the value of the predicted relative data head position, $x_1(k+1)$, which are used, are, respectively, those loaded into the RAM 62 of the DSP 60 and the rescaled value from the most recent step 94.

The velocity trajectory, $v_{cmd}(k+1)$, is then adjusted to take on the sign of the expression $(-\bar{x}_1(k+1))$, and combined with the predicted velocity, $\bar{x}_2(k+1)$, and the predicted bias, $\bar{x}_3(k+1)$, of the data head, to form the precalculated value, $u_{pre\ cal}(k+1)$, to be used during the next servo sector sample. In the coarse seek operating mode the precalculated value, $u_{pre\ cal}(k+1)$, is calculated as follows:

$$u_{pre\ cal}(k+1)=k_2(v_{cmd}(k+1)-\bar{x}_2(k+1))-k_3\bar{x}_3(k+1)$$

The values of the elements $k_2$ and $k_3$ of the estimator gain matrix, K, which are used, are those loaded into the RAM 62 of the DSP 60 in the most recent step 94. Next at step 88, the servo control system waits for a servo sector sample.

While illustrative embodiments and applications of this invention have been shown and described, it would be apparent to those skilled in the art that many more modifications than have been mentioned above are possible without departing from the inventive concepts herein. The invention, therefore, is not to be limited except in the spirit of the appended claims.

What is claimed is:

1. A method of controlling data track seeking and track following of a head in a data recording disk file having servo information of radially repetitive bands of a fixed number of uniquely identifiable concentric tracks either as continuous tracks on a dedicated servo disk surface or as sectors of tracks on a data disk surface or as a combination of continuous tracks on a dedicated servo disk surface and sectors of tracks on a data disk surface, said head for reading samples of said servo information during rotation of said disk, means for providing from said servo information a track number and a position error signal representative of a position of said head relative to a centerline of a nearest track, an actuator connected to said head by a support arm assembly said actuator, said data recording disk file having at least three sets of constants associated therewith representative of dynamics of said data recording disk file, wherein each set of said at least three sets of constants corresponds to a selected number of said tracks and said actuator is responsive to an input signal for positioning said head to a centerline of a target track during track seeking and maintaining the head over said centerline of said target track during track following, said method comprising the steps of:

predicting, for each servo information sample, a relative data head position, a data head velocity, and a data head bias;

determining, for each servo information sample, whether said predicted relative data head position corresponds to the selected number of tracks, and if not, rescaling said predicted relative data head position and said predicted head velocity to form said predicted relative data head position and said predicted head velocity according to the selected number of tracks of said predicted data head position prior to rescaling, and changing the set of the one of at least three sets of constants to correspond to the selected number of tracks of said predicted data head position prior to rescaling;

forming, for each servo control sample, a measured relative data head position from the track number, the position error signal and the target track;

estimating, for each servo control sample, an error in a relative data head position; and generating, for each servo information sample, a control signal as a function of said error in said relative data head position, said predicted relative data head position, said predicted data head velocity, and said predicted data head bias.

2. A method according to claim 1 wherein in the step of predicting a relative data head position, a data head velocity, and a data head bias said relative data head position, said data head velocity, and said data head bias are functions of a prior predicted relative data head position, a prior predicted data head velocity, a prior predicted data head bias, said estimated error, said control signal, a prior control signal and the set of the one of at least three sets of constants.

3. A method according to claim 2 wherein the step of predicting said relative data head position includes computing the summation of said prior predicted relative data head position, said prior predicted data head velocity scaled by a first constant of the set of the one of at least three sets of constants, said prior predicted data head bias scaled by a second constant of the set of the one of at least three sets of constants, said estimated error scaled by an estimator gain, said control signal scaled by a third constant of the set of the one of at least three sets of constants, and said prior control signal scaled by a fourth constant of the set of the one of at least three sets of constants.

4. A method according to claim 2 wherein the step of predicting said data head velocity includes the step of computing the summation of said prior predicted data head velocity, said prior predicted data head bias scaled by a first constant of the set of the one of at least three sets of constants, said estimated error scaled by an estimator gain, said control signal scaled by a second constant of the set of the one of at least three sets of constants, and said prior control signal scaled by a third constant of the set of the one of at least three sets of constants.

5. A method according to claim 2 wherein the step of predicting said data head bias includes the step of computing the summation of said prior predicted data head bias and said estimated error scaled by an estimator gain.

6. A method according to claim 1 wherein the step of forming a measured relative data head position from the track number, the position error signal and the target track includes the steps of determining a track number and computing a relative data head position from said track number and a target track number.

7. A method according to claim 1 wherein the step of estimating an error in a relative data head position is a function of a prior predicted data head position and said measured data head position.

8. A method according to claim 1 wherein the step of estimating an error in said relative data head position includes the step of computing a difference between said measured data head position and said prior predicted data head position.

9. A method according to claim 1 including the step of adjusting, for each servo information sample, said predicted data head velocity with a velocity trajectory.

10. A method according to claim 9 wherein said velocity trajectory is computed as a function of said predicted relative data head position.

11. A method according to claim 1 wherein the step of generating a control signal is also a function of said adjusted data head velocity.

12. A method according to claim 1 including the step of determining, for each servo information sample, whether said predicted relative data head position corresponds to the selected number of tracks, and if not, rescaling said predicted data head bias and according to the selected number of tracks of said predicted data head position prior to rescaling, and changing the set of the one of at least three sets of constants to correspond to the selected number of tracks.

13. A method according to claim 1 wherein the step of rescaling said predicted relative data head position to form said predicted relative data head position according to the selected number of tracks of said predicted data head position prior to rescaling includes the step of multiplying by sixteen said predicted relative data head position according to the selected number of tracks of said predicted data head position prior to rescaling to form said predicted relative data head position.

14. A method according to claim 1 wherein the step of rescaling said predicted relative data head position to form said predicted relative data head position according to the selected number of tracks of said predicted data head position prior to rescaling includes the step of multiplying by eight said predicted relative data head position according to the selected number of tracks of said predicted data head position prior to rescaling to form said predicted relative data head position.

15. A method according to claim 1 wherein the step of rescaling said predicted relative data head position to form said predicted relative data head position according to the selected number of tracks of said predicted data head position prior to rescaling includes the step of summing a) a division by sixteen said predicted relative data head position according to the selected number of tracks of said predicted data head position prior to rescaling to form said predicted relative data head position and b) a difference between the target track and a subsequent target track.

16. A method according to claim 1 wherein the step of rescaling said predicted relative data head position to form said predicted relative data head position according to the selected number of tracks of said predicted data head position prior to rescaling includes the step of summing a) a division by one hundred and twenty-eight said predicted relative data head position according to the selected number of tracks of said predicted data head position prior to rescaling to form said predicted relative data head position and b) a difference between the target track and a subsequent target track.

17. A method according to claim 1 wherein the actuator is a voice coil motor.

18. A method according to claim 1 wherein the constants representative of the dynamics of the data recording disk file are parameters modeling the actuator, the data head and the support arm assembly.

19. A method of controlling data track seeking and track following of a head in a data recording disk file having servo information of radially repetitive bands of a fixed number of uniquely identifiable concentric tracks either as continuous tracks on a dedicated servo disk surface or as sectors of tracks on a data disk surface or as a combination of continuous tracks on a dedicated servo disk surface and sectors of tracks on a data disk surface, said head for reading samples of said servo information during rotation of said disk, means for providing from said servo information a track number and a position error signal representative of a position of said head relative to a centerline of a nearest track, an actuator connected to said head by a support arm assembly said actuator, said data recording disk file having at least three sets of constants associated therewith representative of dynamics of said data recording disk file, wherein each set of said at least three sets of constants corresponds to a selected number of said tracks and said actuator is responsive to an input signal for positioning said head to a centerline of a target track during track seeking and maintaining the head over said centerline of said target track during track following, said method comprising the steps of:

determining, for each servo information sample, a track number;

computing, for each servo information sample, a relative data head position from said track number and a target track number;

forming, for each servo information sample, a relative measured data head position from said relative data head position and the position error signal;

computing, for each servo information sample, an estimated error in said measured data head position;

generating, for each servo information sample, a control signal as a function of said estimated error and a precalculated control signal from a prior servo information sample;

scaling, for each servo information sample, said control signal by a control signal gain;

limiting, for each servo information sample, said scaled control signal by a maximum available power supply;

providing, for each servo information sample, said limited control signal as an input signal to the actuator;

predicting, for each servo information sample, a relative data head position, a data head velocity and a data head bias as functions of a prior predicted relative data head position, a prior predicted data head velocity, a prior predicted data head bias, said estimated error, said control signal, a prior control signal and the set of the one of at least three sets of constants;

determining, for each servo information sample, whether said predicted relative data head position corresponds to selected number of tracks, and if not, rescaling said predicted relative data head position and said predicted head velocity to form said predicted relative data head position and said predicted head velocity according to the selected number of tracks of said predicted data head position prior to rescaling, and changing the set of the one of at least three sets of constants to correspond to the selected number of tracks of said predicted data head position prior to rescaling;

computing, for each servo information sample, a velocity trajectory as a function of said predicted relative data head position; and generating, for each servo information sample, a precalculated control signal as a function of said velocity trajectory, said predicted data head velocity and said predicted data head bias if the servo control system is track seeking, and as function of said predicted relative data head position, said predicted data head velocity and said data head bias if the servo control system is track following.

20. A method according to claim 19 wherein the step of calculating a relative data head position includes the step of computing a difference between said track number and said target track number.

21. A method according to claim 19 wherein the step of forming a relative measured position includes the step of allocating a selected number bits to said relative data head position and a selected number of bits to the position error signal according to the selected number of tracks corresponding to said predicted relative data head position.

22. A method according to claim 19 wherein the step of computing an estimated error in said measured data head position includes the step of computing a difference between said measured data head position and said prior predicted data head position.

23. A method according to claim 19 wherein the step of generating a control signal as a function of said estimated error and a precalculated control signal includes the step of computing the difference between a) said precalculated control signal and b) said estimated error scaled by an estimated error gain.

24. A method according to claim 19 wherein the step of predicting said relative data head position includes the step of computing the summation of said prior predicted relative data head position, said prior predicted data head velocity scaled by a first constant of the set of the one of at least three sets of constants, said prior predicted data head bias scaled by a second constant of the set of the one of at least three sets of constants, said estimated error scaled by an estimator gain, said control signal scaled by a third constant of the set of the one of at least three sets of constants, and said prior control signal scaled by a fourth constant of the set of the one of at least three sets of constants.

25. A method according to claim 19 wherein the step of predicting said data head velocity includes the step of computing the summation of said prior predicted data head velocity, said prior predicted data head bias scaled by a first constant of the set of the one of at least three sets of constants, said estimated error scaled by an estimator gain, said control signal scaled by a second constant of the set of the one of at least three sets of constants, and said prior control signal scaled by a third constant of the set of the one of at least three sets of constants.

26. A method according to claim 19 wherein the step of predicting said data head bias includes the step of computing the summation of said prior predicted data head bias and said estimated error scaled by an estimator gain.

27. A method according to claim 19 wherein the step of generating a precalculated control signal when the servo control system is track seeking includes computing the difference between a) the difference of said velocity trajectory and said predicted data head velocity, scaled by a first constant of the set of the one of at least three sets of constants and b) said predicted data head bias by a second constant of the set of the one of at least three sets of constants.

28. A method according to claim 19 wherein the step of generating a precalculated control signal when the servo control system is track following includes computing the negative of the summation of said predicted relative data head position scaled by a first constant of the set of the one of at least three sets of constants, said predicted data head velocity scaled by a second constant of the set of the one of at least three sets of constants, and said predicted data head bias scaled by a third constant of the set of the one of at least three sets of constants.

29. A method according to claim 19 including the step determining, for each servo information sample, whether said predicted relative data head position corresponds to the selected number of tracks, and if not, rescaling said predicted data head bias to form said predicted data head bias according to the selected number of tracks of said predicted data head position prior to rescaling.

30. A method according to claim 19 wherein the actuator is a voice coil motor.

31. A method according to claim 19 wherein the constants representative of the dynamics of the data recording disk file are parameters modeling the actuator, the data head and the support arm assembly.

32. A method of positioning a data head to a target track on a data disk surface having at least $2^n$ concentric data tracks, wherein n is a number of data bits needed to enumerate all of said at least $2^n$ concentric data tracks, in a data disk file wherein said data head is connected to an actuator by a support arm assembly, said data disk file having at least one disk surface having recorded thereon data track number identification information and servo burst information identifying said data head position within a data track, said data disk file having a servo control loop directed by one of at least a first, second and third operating mode, said first operating mode selected for operation while said data head is between a first number of tracks and a second number of tracks of radial distance from said target track, said second number less than said first number, said second operating mode selected for operation while said data head is between said second number of tracks and less than one track of radial distance from said target track, said third operating mode selected for operation while said head is less than one track of radial distance from said target track, said method comprising the steps of:

sensing the position of the data head over the disk surface to supply data head position information to a CPU in the servo control loop by reading data track number identification information of the one of the $2^n$ concentric data tracks on the disk surface over which the data head is flying and reading servo burst information of said one of the $2^n$ concentric data tracks to measure the position of the data head in the data track to a resolution of at least one part in $2^m$, wherein m is a number of data bits needed to represent the position of the data head to said resolution of said at least one part in $2^m$;

encoding said data head position information into a data field having a width less than m+n bits to supply data head position on the disk surface information to said CPU having a data input path of less than m+n bits;

predicting by said CPU using said encoded data head position information a data head position, a data head velocity and a data head bias to generate a servo control signal;

generating said servo control signal by said CPU to move the data head; and moving the data head in response to said servo control signal.

33. A method according to claim 32 wherein the step of encoding includes the step of computing a difference between the data track number identification information and the target track to calculate a relative data head position.

34. A method according to claim 32 wherein the step of encoding comprises encoding a first selected portion of the data field with the data track number information and encoding a second selected portion of the data field with the servo burst wherein the first and second selected portions of the data field are determined by a current operating mode.

35. A method according to claim 32 further including the step of computing an estimated error in the position of the data head by computing a difference between the position of the data head and a prior predicted data head position.

36. A method according to claim 32 further including the step of scaling said servo control signal by a control signal gain.

37. A method according to claim 32 further including the step of limiting said servo control signal by a maximum available power supply.

38. A method according to claim 32 further including the step of computing a velocity trajectory as a function of said predicted data head position to adjust the predicted data head velocity.

39. A method according to claim 32 wherein the step of predicting said data head position, said data head velocity and said data head bias, comprises computing said predictions as a function of a prior predicted data head position, a prior predicted data head velocity, a prior predicted data head bias, an estimated error, said servo control signal, a prior control signal and a set of constants determined by a current operating mode of the servo control loop.

40. A method according to claim 32 wherein the step of predicting said data head position comprises computing a summation of a prior predicted data head position, a prior predicted data head velocity scaled by a first constant of a set of constants determined by a current operating mode, a prior predicted data head bias scaled by a second constant of said set of constants determined by said current operating mode, an estimated error scaled by an estimator gain, said control signal scaled by a third constant of said set of constants determined by said current operating mode, and a prior control signal scaled by a fourth constant of said set of constants determined by said current operating mode.

41. A method according to claim 32 wherein the step of predicting said data head velocity comprises computing a summation of a prior predicted data head velocity, a prior predicted data head bias scaled by a first constant of a set of constants determined by a current operating mode, an estimated error scaled by an estimator gain, said control signal scaled by a second constant of said set of constants determined by a current operating mode, and a prior control signal scaled by a third constant of said set of constants determined by said current operating mode.

42. A method according to claim 32 wherein the step of predicting said data head bias comprises computing a summation of a prior predicted data head bias and an estimated error scaled by an estimator gain.

43. A method according to claim 32 further including the step of determining whether said predicted data head position is within the radial distance of a current operating mode, and if not, rescaling said predicted data head position and said predicted data head velocity to form said predicted data head position and said predicted data head velocity according to an operating mode with a radial distance to which said predicted data head position is within prior to rescaling, and changing a set of constants to correspond to said operating mode with a radial distance to which said predicted data head position is within prior to rescaling.

44. A method according to claim 32 including the step of determining whether said predicted relative data head position is within the radial distance of a current operating mode, and if not, rescaling said predicted data head bias to form said predicted data head bias according to an operating mode with a radial distance to which said predicted data head position is within prior to rescaling.

* * * * *

UNITED STATES PATENT AND TRADEMARK OFFICE
CERTIFICATE OF CORRECTION

PATENT NO. : 5,576,909
DATED : November 19, 1996
INVENTOR(S) : Franz J. Dierkes, Fidencio Mederos, Ich Van Pham It is certified that error appears in the above-indentified patent and that said Letters Patent is hereby corrected as shown below:

In Col. 1, line 33, replace "RNV" with --R/W--.

In Col. 1, line 34, replace "RAN" with --R/W--.

In Col. 3, line 51, replace "Ministor" with --MiniStor--.

In Col. 3, line 53, replace "Ministor" with --MiniStor--.

In Col. 4, line 17, replace "Ministor" with --MiniStor--.

In Col. 6, line 4, replace "product'" with --product--.

In Col. 8, line 4, replace " became" with --become--.

In Col. 10, line 9, after the first instance of "is" insert --in--.

In Col. 10, line 27, replace "an" with --a--.

In Col. 10, line 48, replace "ND" with --A/D--.

In Col. 11, line 19, replace "ND" with --A/D--.

In Col. 11, line 32, replace "ND" with --A/D--.

In Col. 11, line 44, replace "ND" with --A/D--.

In Col. 11, line 56, replace ". The" with --, the--.

In Col. 12, line 26, replace "interrupts" with --interrupt-- .

In Col. 12, line 57, after the second occurrence of "the" insert --hardware described in--.

UNITED STATES PATENT AND TRADEMARK OFFICE
CERTIFICATE OF CORRECTION

PATENT NO. : 5,576,909
DATED : November 19, 1996
INVENTOR(S) : Franz J. Dierkes, Fidencio Mederos, Ich Van Pham It is certified that error appears in the above-indentified patent and that said Letters Patent is hereby corrected as shown below:

In Col. 12, line 65, replace "$K_{plant}=K_d K_p K_T K_x K_a{}^r/jS_f$" with -- $K_{plant}=K_d K_p K_T K_x K_a r/jS_f$ --.

In Col. 13, line 13, after "of the" delete "of the".

In Col. 13, line 35, replace "N.m" with --N·m--.

In Col. 13, line 46, replace "N.m" with --N·m--.

In Col. 13, line 47, replace "Kg.m$^2$" with --Kg·m$^2$--.

In Col. 14, line 36, after "number" insert --of--.

In Col. 15, line 6, replace "$x_1(k)$" with -- $\bar{x}_1(k)$ --.

In Col. 15, line 53, replace "$kes_t$ err" with --$k_{est}$ err--.

In Col. 15, line 58, after "as" insert --a--.

In Col. 16, line 56, replace "$\varepsilon_1$" with --$\Gamma_1$--.

In Col. 16, line 56, replace "$\varepsilon_2$" with --$\Gamma_2$--.

In Col. 17, line 8, replace "$\varepsilon_1$" with --$\Gamma_1$--.

In Col. 17, line 8, replace "$\varepsilon_2$" with --$\Gamma_2$--.

In Col. 17, line 25, replace "$\varepsilon_1$" with --$\Gamma_1$--.

UNITED STATES PATENT AND TRADEMARK OFFICE
CERTIFICATE OF CORRECTION

PATENT NO. : 5,576,909
DATED : November 19, 1996
INVENTOR(S) : Franz J. Dierkes, Fidencio Mederos, Ich Van Pham It is certified that error appears in the above-indentified patent and that said Letters Patent is hereby corrected as shown below:

In Col. 17, line 25, replace "$\varepsilon_2$" with --$\Gamma_2$--.

In Col. 17, line 29, replace "$\varepsilon_1$" with --$\Gamma_1$--.

In Col. 17, line 29, replace "$\varepsilon_2$" with --$\Gamma_2$--.

In Col. 17, line 58, after "uncertainty" insert --in--.

In Col. 17, line 67, replace "$\varepsilon_1$" with --$\Gamma_1$--.

In Col. 18, line 1, replace "$\varepsilon_2$" with --$\Gamma_2$--.

In Col. 18, line 28, after "either" delete "in".

In Col. 18, line 31, replace "l $\overline{x}_1(k+1)$l" with --| $\overline{x}_1(k+1)$|--.

In Col. 18, lines 35-36, replace "l $\overline{x}_1(k+1)$l" with --| $\overline{x}_1(k+1)$|--.

In Col. 18, line 51, replace "$v_{cmd}(k+1)=c_1$l $\overline{x}_1(k+1)$l$^3$ + $c_2$l $\overline{x}_1(k+1)$l$^2$ + $c_3$l $\overline{x}_1(k+1)$l + $c_4$" with --$v_{cmd}(k+1)=c_1$| $\overline{x}_1(k+1)$|$^3$ + $c_2$| $\overline{x}_1(k+1)$|$^2$ + $c_3$| $\overline{x}_1(k+1)$| + $c_4$--.

In Col. 19, line 16, replace "K=l$k_1 k_2 k_3$l" with --K=|$k_1 k_2 k_3$|--.

In Col. 19, line 20, replace "lccp" with --loop--.

UNITED STATES PATENT AND TRADEMARK OFFICE
CERTIFICATE OF CORRECTION

PATENT NO. : 5,576,909
DATED : November 19, 1996
INVENTOR(S) : Franz J. Dierkes, Fidencio Mederos, Ich Van Pham It is certified that error appears in the above-indentified patent and that said Letters Patent is hereby corrected as shown below:

In Col. 19, line 23, replace "lccp" with --loop--.

In Col. 19, lines 49-50, replace "I $\overline{x}_1(k+1)$I" with --I $\overline{x}_1(k+1)$I--.

In Col. 20, line 43, replace "$\varepsilon_1$" with --$\Gamma_1$--.

In Col. 20, line 43, replace "$\varepsilon_2$" with --$\Gamma_2$--.

In Col. 21, line 34, replace "constants," with --constants--.

In Col. 21, line 43, replace "valuea" with --value--.

In Col. 21, line 54, replace " $\overline{x}_1(k+)$" with -- $\overline{x}_1(k+1)$--., $^{11}$=x," should be-- $\overline{x}_1$--.

In Col. 22, line 53, replace "u(k)=u$_{pre\ cal}$(k)-k$_{est\ err}$(k)" with --u(k)=u$_{pre\ cal}$(k)-k$_{est\ err}$x$_{est\ err}$(k)--.

In Col. 22, line 66, replace "u$_{dec}$(k)" with --u$_{dac}$(k)--.

In Col. 23, line 19, before "L$_1$x$_{est\ err}$(k)" replace "" with --+--.

In Col. 23, line 26, replace "$\varepsilon_1$" with --$\Gamma_1$--.

In Col. 23, line 26, replace "$\varepsilon_2$" with --$\Gamma_2$--.

In Col. 24, line 7, replace "I $\overline{x}_1(k+1)$I" with --I $\overline{x}_1(k+1)$I--.

UNITED STATES PATENT AND TRADEMARK OFFICE
CERTIFICATE OF CORRECTION

PATENT NO. : 5,576,909
DATED : November 19, 1996
INVENTOR(S) : Franz J. Dierkes, Fidencio Mederos, Ich Van Pham It is certified that error appears in the above-indentified patent and that said Letters Patent is hereby corrected as shown below:

In Col. 24, line 20, replace "$v_{cmd}(k+1)=c_1 |\overline{x}_1(k+1)|^3 + c_2 |\overline{x}_1(k+1)|^2 + c_3 |x_1(k+1)| + c_4$" with --$v_{cmd}(k+1)=c_1 |\overline{x}_1(k+1)|^3 + c_2 |\overline{x}_1(k+1)|^2 + c_3 |\overline{x}_1(k+1)| + c_4$--.

In Col. 24, line 44, replace "$u_{precal}(k+1)$" with --$u_{pre\,cal}(k+1)$--.

In Col. 25, lines 16-17, replace "$|\overline{x}_1(k+1)|$" with --$|\overline{x}_1(k+1)|$--.

In Col. 25, line 22, after the element "Z8" insert --58--.

In Col. 25, line 28, after the element "DSP" insert --60--.

In Col. 25, line 30, replace "$\varepsilon_1$ and $\varepsilon_2$" with --$\Gamma_1$ and $\Gamma_2$-- .

In Col. 25, line 43, replace "$G_{22}$" with --$G_{21}$--.

In Col. 26, line 18, after "point))" insert --a carriage return--.

In Col. 26, line 33, after the first instance of "FS", replace "$x_2$" with --$x_1$--.

In Col. 26, line 50, replace "$v_{cmd}(k+1)=c_1 |\overline{x}_1(k+1)|^3 + c_2 |\overline{x}_1(k+1)|^2 + c_3 |\overline{x}_1(k+1)| + c_4$" with --$v_{cmd}(k+1)=c_1 |\overline{x}_1(k+1)|^3 + c_2 |\overline{x}_1(k+1)|^2 + c_3 |\overline{x}_1(k+1)| + c_4$--.

UNITED STATES PATENT AND TRADEMARK OFFICE
CERTIFICATE OF CORRECTION

PATENT NO. : 5,576,909
DATED : November 19, 1996
INVENTOR(S) : Franz J. Dierkes, Fidencio Mederos, Ich Van Pham It is certified that error appears in the above-indentified patent and that said Letters Patent is hereby corrected as shown below:

In Col. 27, line 58, replace "$iL_1x_{est\ err}(k)$" with --$L_1x_{est\ err}(k)$--.

In Col. 27, line 66, replace "$\varepsilon_1$ and $\varepsilon_2$" with --$\Gamma_1$ and $\Gamma_2$--.

In Col. 28, lines 25-26, replace "$|\overline{x}_1(k+1)|$" with --$|\overline{x}_1(k+1)|$-- .

In Col. 28, line 32, after "Z8" insert --58--.

In Col. 28, line 44, after "DSP" insert --60--.

In Col. 28, line 45, replace "$\varepsilon_1$ and $\varepsilon_2$" with --$\Gamma_1$ and $\Gamma_1$--.

In Col. 29, line 14, replace "$F_{13}3$(floating point)" with --$F_{13}$(floating point)--.

In Col. 29, line 59, replace "$k_1x\ \overline{x}_1(k+1)$" with --$k_1\ \overline{x}_1(k+1)$--.

In Col. 30, line 58, replace "$G_{11}u(-1)$" with --$G_{11}u(k-1)$--.

In Col. 30, line 62, replace " $\overline{x}x_3(k)$" with -- $\overline{x}_3(k)$--.

In Col. 30, line 65, replace "$\varepsilon_1$ and $\varepsilon_2$" with --$\Gamma_1$ and $\Gamma_2$-- .

In Col. 31, line 20, replace "$|\overline{x}_1(k+1)|$" with --$|\overline{x}_1(k+1)|$--.

In Col. 31, line 30, after "Z8" insert --58--.

In Col. 31, line 45, after "DSP" insert --60--.

UNITED STATES PATENT AND TRADEMARK OFFICE
CERTIFICATE OF CORRECTION

PATENT NO. : 5,576,909
DATED : November 19, 1996
INVENTOR(S) : Franz J. Dierkes, Fidencio Mederos, Ich Van Pham It is certified that error appears in the above-indentified patent and that said Letters Patent is hereby corrected as shown below:

In Col. 31, line 47, replace "$\varepsilon_1$ and $\varepsilon_2$" with --$\Gamma_1$ and $\Gamma_2$--.

In Col. 32, line 15, replace "$v_{cmd}(k+1)=c_1|\overline{x}_1(k+1)|^3 + c_2|\overline{x}_1(k+1)|^2 + c_3|\overline{x}_1(k+1)| + c_4$" with --$v_{cmd}(k+1)=c_1|\overline{x}_1(k+1)|^3 + c_2|\overline{x}_1(k+1)|^2 + c_3|\overline{x}_1(k+1)| + c_4$--.

In Col. 32, line 56, after "assembly" delete "said actuator".

In Col. 35, line 12, after "assembly" delete "said actuator".

In Col. 35, line 66, after "as" insert --a--.

In Col. 36, line 9, after "number" insert --of--.

Signed and Sealed this

Sixth Day of May, 1997

Attest:

BRUCE LEHMAN

Attesting Officer

Commissioner of Patents and Trademarks